(12) United States Patent
Sun et al.

(10) Patent No.: US 8,849,125 B2
(45) Date of Patent: Sep. 30, 2014

(54) PROCESSING THREE-QUADRATURE AMPLITUDE MODULATION (3QAM) TRAFFIC USING A FOUR-BIT PHASE MODULATION SCHEME

(75) Inventors: Han Henry Sun, Ottawa (CA); Kuang-Tsan Wu, Kanata (CA)

(73) Assignee: Infinera Corporation, Sunnyvale, CA (US)

( * ) Notice: Subject to any disclaimer, the term of this patent is extended or adjusted under 35 U.S.C. 154(b) by 273 days.

(21) Appl. No.: 13/537,634

(22) Filed: Jun. 29, 2012

(65) Prior Publication Data

US 2014/0003814 A1 Jan. 2, 2014

(51) Int. Cl.
H04B 10/00 (2013.01)

(52) U.S. Cl.
USPC ........... 398/140; 398/184; 398/185; 398/186; 398/205

(58) Field of Classification Search
USPC .................................. 398/140–141, 182–214
See application file for complete search history.

(56) References Cited

U.S. PATENT DOCUMENTS

| | | | | |
|---|---|---|---|---|
| 7,167,620 | B2* | 1/2007 | Handelman | 385/122 |
| 7,474,827 | B2* | 1/2009 | Handelman | 385/122 |
| 7,805,049 | B2* | 9/2010 | Handelman | 385/147 |
| 8,594,515 | B2* | 11/2013 | Liu et al. | 398/208 |
| 2003/0128917 | A1* | 7/2003 | Turpin et al. | 385/24 |
| 2004/0197103 | A1* | 10/2004 | Roberts et al. | 398/159 |
| 2005/0013568 | A1* | 1/2005 | Handelman | 385/122 |
| 2007/0104451 | A1* | 5/2007 | Handelman | 385/147 |
| 2009/0136189 | A1* | 5/2009 | Handelman | 385/122 |
| 2010/0178065 | A1* | 7/2010 | Nishihara et al. | 398/202 |
| 2011/0268447 | A1* | 11/2011 | Kitoh et al. | 398/82 |
| 2012/0177386 | A1* | 7/2012 | Zhou et al. | 398/208 |
| 2012/0213531 | A1* | 8/2012 | Nazarathy et al. | 398/202 |
| 2012/0224855 | A1* | 9/2012 | Liu et al. | 398/79 |
| 2012/0321303 | A1* | 12/2012 | Zhang et al. | 398/45 |
| 2013/0121631 | A1* | 5/2013 | Yu et al. | 385/2 |
| 2014/0003815 | A1* | 1/2014 | Mertz | 398/65 |

OTHER PUBLICATIONS

D. S. Millar et al.: "Blind adaptive equalization of polarization-switched QPSK modulation", Optics Express, vol. 19, No. 9, Apr. 2011, pp. 8533-8538.

"Jones calculus" From Wikipedia, the free encyclopedia; retrieved online at: http://en.wikipedia.org/wiki/Jones_calculus, print date May 10, 2012, 8 pages.

P. Poggiolini et al.: "Performance evaluation of coherent WDM PS-QPSK (HEXA) accounting for non-linear fiber propagation effects", Optics Express, vol. 18, No. 11, May 24, 2010, pp. 11360-11371.

(Continued)

*Primary Examiner* — Agustin Bello
(74) *Attorney, Agent, or Firm* — Harrity & Harrity LLP; David L. Soltz

(57) ABSTRACT

A system receives traffic that includes four-bit symbols, the four-bit symbols being encoded using a four-bit phase modulation scheme; and processes the traffic to recover a four-bit symbol. The system also decodes the recovered four-bit symbol to obtain a three-bit symbol. The three-bit symbol is associated with a three-quadrature amplitude modulation (3QAM) scheme, and the decoding is performed without creating an error, within the traffic, when cycle slip occurs. The system outputs the traffic based on the three-bit symbol.

25 Claims, 8 Drawing Sheets

(56) References Cited

OTHER PUBLICATIONS

M. K. Simon et al.: "On the Optimality of Classical Coherent Receivers of Differentially Encoded M-PSK", IEEE Communications Letters, vol. 1, No. 3, May 1997, pp. 67-70.

G. Bosco et al.: "Performance Evaluation of Coherent PS-QPSK (HEXA) Modulation", Optical Society of America, 2011, 2 pages.

E. Agrell et al.: "Power-Efficient Modulation Formats in Coherent Transmission Systems", Journal of Lightwave Technology, vol. 27, No. 22, Nov. 15, 2009, pp. 5115-5126.

* cited by examiner

| 3QAM Symbol 305 | X POL / IN-PHASE BIT 310 | X POL / QUAD BIT 315 | Y POL / IN-PHASE BIT 320 | Y POL / QUAD BIT 325 |
|---|---|---|---|---|
| 000 | -1 | -1 | -1 | -1 |
| 001 | -1 | -1 | -1 | 1 |
| 010 | -1 | -1 | 1 | -1 |
| 011 | -1 | 1 | -1 | -1 |
| 100 | 1 | -1 | -1 | 1 |
| 101 | 1 | -1 | 1 | -1 |
| 110 | 1 | 1 | -1 | 1 |
| 111 | 1 | 1 | 1 | 1 |

FIG. 3

PROCESSING THREE-QUADRATURE AMPLITUDE MODULATION (3QAM) TRAFFIC USING A FOUR-BIT PHASE MODULATION SCHEME

BACKGROUND

Coherent optical receivers may use different modulation techniques (e.g., phase shift keying, frequency modulation, etc.) to process traffic received from an optical network. Examples of common phase shift keying techniques include polarization multiplexed (PM) binary phase shift keying (PM-BPSK), and PM-quadrature phase shift keying (PM-QPSK) (sometimes referred to as "four-quadrature amplitude modulation (4QAM)"). PM-BPSK uses two bits to represent a dual-polarized symbol and PM-QPSK uses four bits to represent a dual-polarized symbol. Recently, another phase shift keying technique has emerged that represents a hybrid of the PM-BPSK and PM-QPSK techniques (sometimes referred to as "three-quadrature amplitude modulation (3QAM)" or "HEXA"). 3QAM uses three bits to represent a dual-polarized symbol. Unfortunately, coherent optical receivers, that process PM-QPSK and/or PM-BPSK traffic, cannot process 3QAM traffic without incurring cycle slips that cause catastrophic bit error rates and/or a disruption of service.

SUMMARY

According to one implementation, a method may include receiving, by an optical receiver, traffic that includes four-bit symbols, the four-bit symbols may be encoded using a four-bit phase modulation scheme; and processing, by the optical receiver, the traffic to recover a four-bit symbol of the four-bit symbols. The method may also include decoding, by the optical receiver, the recovered four-bit symbol to obtain a three-bit symbol. The three-bit symbol may be associated with a three-quadrature amplitude modulation (3QAM) scheme and the decoding may be performed without creating an error, within the traffic, when cycle slip occurs, The cycle slip may occur when the recovered four-bit symbol includes a first state, of a set of modulation states associated with the four-bit phase modulation scheme, that is different than a second state, of the set of modulation states, that exists before the recovered four-bit symbol is transmitted to the optical receiver. The method may further include outputting, by the optical receiver, the traffic based on the three-bit symbol.

According to another implementation, an optical receiver device may include one or more components to: receive traffic associated with a three-bit phase modulation scheme, the traffic may include a group of four-bit symbols, the group of four-bit symbols may be encoded using a four-bit phase modulation scheme; and process the traffic to obtain, from the traffic, a four-bit symbol of the group of four-bit symbols. The one or more components may also be to: decode the four-bit symbol to create a decoded four-bit symbol, the decoded four-bit symbol may be associated with a first modulation state, of a set of modulation states, associated with the four-bit phase modulation scheme; generate, based on the decoded four-bit symbol, a three-bit symbol, the three-bit symbol may correspond to the three-bit phase modulation scheme, and the generating may be performed in a manner that does not cause an error when cycle slip occurs. The cycle slip may occur when the first modulation state is different than a second modulation state, with which the four-bit symbol was associated, before the four-bit symbol is transmitted to the optical receiver device. The one or more components may further be to output the three-bit symbol.

According to a further implementation, an optical transmitter device may include one or more components to: receive traffic that includes a group of bits; process one or more bits, of the group of bits, to create a three-bit symbol, of a set of three-bit symbols, associated with a three-quadrature amplitude modulation (3QAM) mechanism; and identify a four-bit symbol, of a set of four-bit symbols associated with a polarization multiplexed-quadrature phase shift keying (PM-QPSK) modulation mechanism, that corresponds to the three-bit symbol. The one or more components may also be to: generate the identified four-bit symbol; encode the identified four-bit symbol; and transmit the encoded four-bit symbol.

According to another implementation, a system may include an optical transmitter device to receive traffic that includes a group of three-bit symbols associated with three-quadrature amplitude modulation (3QAM). The optical transmitter device may also be to encode the traffic, the encoding may cause a three-bit symbol, of the group of three-bit symbols, to be encoded as a four-bit symbol associated with polarization multiplexed-quadrature phase shift keying (PM-QPSK) modulation; and output the encoded traffic, the encoded traffic may include the four-bit symbol. The system may also include an optical receiver device to: receive the encoded traffic; and process the encoded traffic to recover the four-bit symbol. The optical receiver device may also be to decode the four-bit symbol to recover the three-bit symbol, the decoding may be performed without creating an error, in the traffic, when cycle slip occurs when the traffic is processed; and output the processed traffic, the processed traffic may include the recovered three-bit symbol.

BRIEF DESCRIPTION OF THE DRAWINGS

FIG. 3 is a diagram of an example data structure that stores information that associates three-bit three-quadrature amplitude modulation (3QAM) symbols with four-bit polarization multiplexed-quadrature phase shift keying (PM-QPSK) symbols;

DETAILED DESCRIPTION

The following detailed description refers to the accompanying drawings. The same reference numbers in different drawings may identify the same or similar elements.

Systems and/or methods, in an example implementation described herein, may enable traffic, associated with three-quadrature amplitude modulation (3QAM), to be processed by a coherent optical system that handles traffic associated with a polarization multiplexed-quadrature phase shift keying (PM-QPSK) modulation. Enabling the coherent optical system to process the 3QAM traffic may permit the coherent optical system to continue to process traffic, using 3QAM techniques, when sufficient system margin (e.g., noise tolerance, reserve processing capacity, etc.) is not available to process traffic using PM-QPSK modulation techniques. Additionally, or alternatively, processing traffic, using the 3QAM techniques, may permit the coherent optical system to continue to process the traffic at a higher throughput than when processing traffic using PM-binary phase shift keying (PM-BPSK) modulation techniques.

Systems and/or methods may enable the coherent optical system to encode the 3QAM traffic, using PM-QPSK modulation techniques, in a manner that allows cycle slip, within received traffic, to be detected. The coherent optical system may also, or alternatively, decode the encoded traffic using PM-QPSK de-modulation techniques. Decoding the encoded traffic may enable the coherent optical system to recover the 3QAM traffic without causing errors due to cycle slip. Generally, cycle slip may occur when a symbol, which is transmitted with a first phase modulation state (e.g., a first PM-QPSK state), is received and/or recovered with a second, valid phase modulation state (e.g., a second PM-QPSK state). The change from the first phase modulation state to the second phase modulation state may be caused by noise, imperfections, etc. associated with a transmission medium (e.g., a fiber optic cable, a network device, etc.) via which the encoded 3QAM traffic is transported.

Figure 1A:
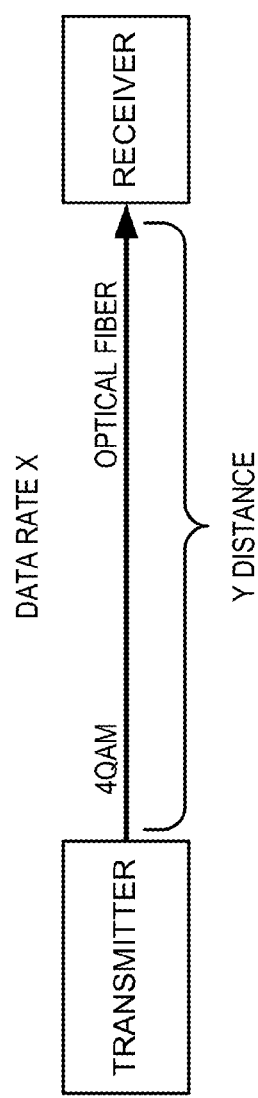
FIGS. 1A and 1B are diagrams illustrating an example coherent optical system.
Figure 1B:
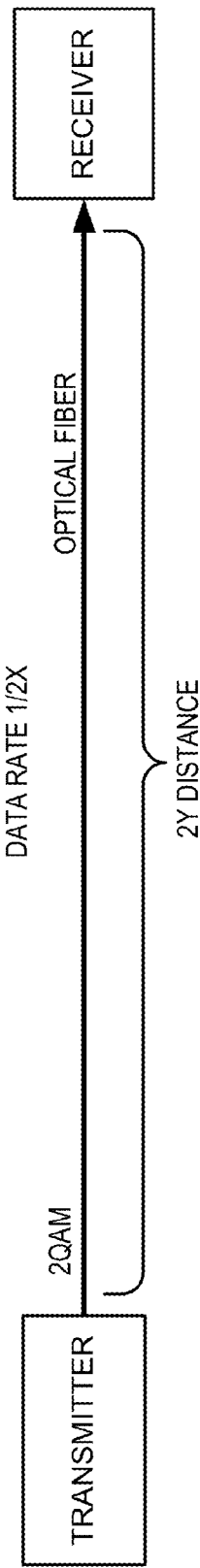

FIGS. 1A and 1B are diagrams illustrating an example coherent optical system 100. As illustrated in FIG. 1A, system 100 may enable traffic, based on PM-QPSK modulation techniques (hereinafter referred to as "PM-QPSK traffic"), to be transmitted between a coherent optical transmitter (e.g., shown as "transmitter") and a coherent optical receiver (e.g., shown as "receiver"). The PM-QPSK traffic may be transmitted over an optical fiber for a first distance (e.g., Y Distance) and may include a first data rate (e.g., data rate X, such as a bit rate, a symbol rate, etc.). The first distance, over which the PM-QPSK traffic is transmitted, may be limited based on noise and/or imperfections in the optical fiber that cause signal quality to degrade. The PM-QPSK traffic may, for example, be based on four-bit dual-polarized symbols that correspond to a first polarization (e.g., a Transverse Electric (TE) polarization or some other first polarization) (hereinafter referred to as "X polarization") and a second polarization (e.g., a transverse magnetic (TM) polarization or some other second polarization) (hereinafter referred to as "Y polarization"). The four bits may, in one example, correspond to a payload bit and three bits associated with error correction and/or identification.

As illustrated in FIG. 1B, system 100 may enable traffic to be transmitted between the coherent optical transmitter and the coherent optical receiver using PM-BPSK modulation techniques (hereinafter referred to as "PM-BPSK traffic"). The PM-BPSK traffic may, for example, be transmitted over a second distance that is greater than the first distance and/or at a second data rate (e.g., data rate 1/2X) that is less than the first data rate. In one example, the second distance may be approximately twice as far (e.g., shown as 2Y distance) as the first distance associated with the PM-QPSK traffic. The second distance may be greater than the first distance due to the PM-BPSK traffic being more tolerant of noise and/or imperfections within the optical fiber. Additionally, the PM-BPSK traffic may include two bits per dual-polarized symbol which may cause the second data rate to be less than the first data rate. The two bits may, for example, correspond to a payload bit and/or a bit associated with error correction and/or identification. In one example, the second data rate may be approximately half of the first data rate (e.g., due to the two bits per PM-BPSK symbol being half of the four bits per PM-QPSK symbol).

In one example, system 100 may determine that PM-QPSK traffic can no longer be transported when sufficient system margin is not available. When the sufficient system margin is not available, system 100 may transport traffic using the PM-BPSK techniques. System margin may, for example, correspond to an amount of noise tolerance of system 100. The noise tolerance may identify a quantity of additional noise that can be tolerated, by system 100, before errors are created in the traffic. When the quantity of errors (e.g., base on a bit error rate, a symbol error rate, etc.) is greater than a threshold, data may be lost, traffic may not be processed, and/or a service disruption may occur.

System 100 may transport the PM-BPSK traffic at a data rate that is less than a data rate associated with the PM-QPSK traffic. Thus, transporting the PM-BPSK traffic, at the lower data rate, may enable system 100 to continue to transport traffic.

Figure 1C:
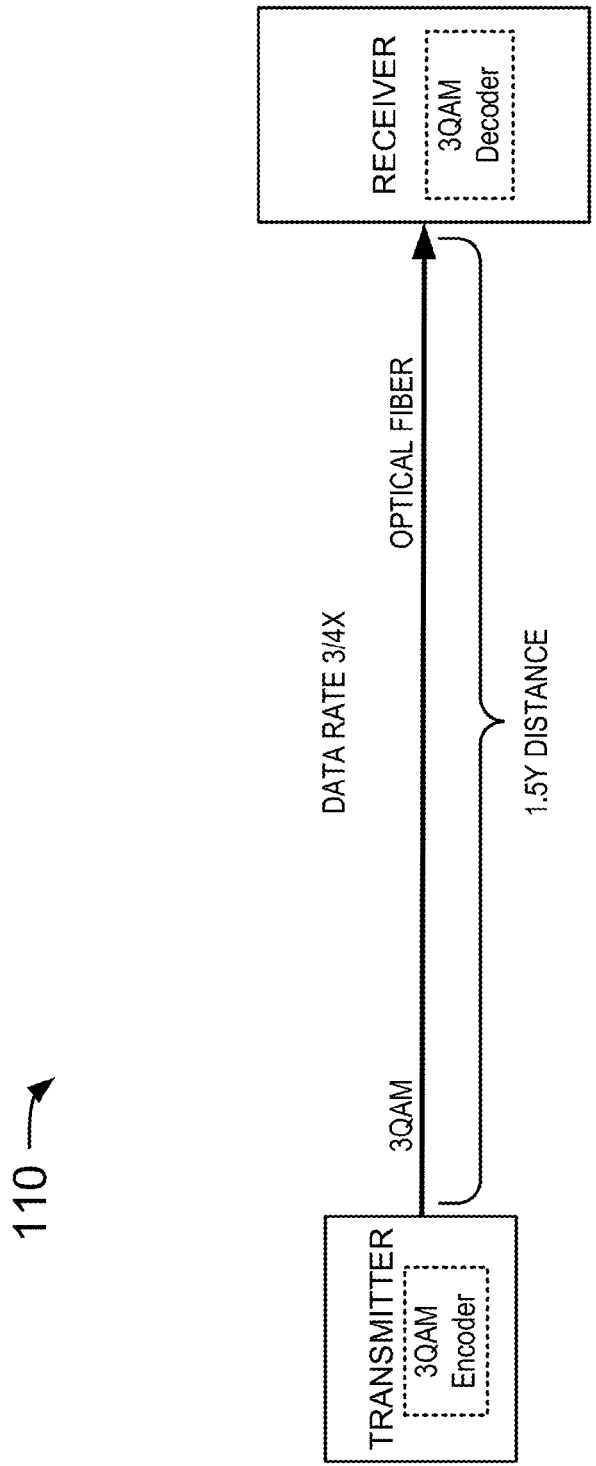
FIG. 1C is a diagram illustrating an overview of an example implementation described herein.

FIG. 1C is a diagram illustrating an overview of an example implementation 110 described herein. As illustrated in FIG. 1C, example implementation 110 may enable a coherent optical system to transport traffic using 3QAM techniques (hereinafter referred to as "3QAM traffic"). The 3QAM traffic may, for example, be transmitted over a third distance that is greater than the first distance associated with the PM-QPSK traffic and less than the second distance associated with the PM-BPSK traffic. In one example, the third distance may be approximately one and one-half as far (e.g., shown as 1.5Y distance) as the first distance and three-fourths as far as the second distance. The third distance may be greater than the first distance due to the 3QAM traffic being more tolerant of noise and/or imperfections within the optical fiber than the PM-QPSK traffic (e.g., due to 3QAM data rate being less than PM-QPSK data rate). The third distance also, or alternatively, may be less than the second distance due to the 3QAM traffic being less tolerant of the noise and imperfections than the PM-BPSK traffic (e.g., due to 3QAM data rate being greater than PM-BPSK data rate).

Additionally, the 3QAM traffic may include three bits per dual polarized symbol which may cause a third data rate of the 3QAM traffic to be less than the first data rate of the PM-QPSK traffic and greater than the second data rate of the PM-BPSK traffic. The three bits may, for example, correspond to a payload bit and/or two bits associated with error correction and/or identification. The third data rate may be approximately three-fourths of the first data rate due to the three bits per 3QAM symbol compared to four bits per PM-QPSK symbol and may be one and one-half times the second data rate due to the three bits per 3QAM symbol compared to 2 bits per PM-BPSK symbol. The coherent optical system may also, or alternatively, transport PM-QPSK traffic and/or PM-BPSK traffic in a manner similar to that described above with respect to FIGS. 1A and/or 1B, respectively.

By way of example, the coherent optical transmitter may transmit 3QAM traffic by using an 3QAM encoding mechanism (e.g., shown as a dashed box labeled "3QAM encoder") to convert three-bit 3QAM symbols to four-bit PM-QPSK symbols in a manner to be described in greater detail below with respect to FIG. 3. The coherent optical transmitter may also, or alternatively, use the 3QAM encoding mechanism to encode the four-bit symbols in a manner that enables cycle slip to be detected by the coherent optical receiver. The coherent optical transmitter may transmit the encoded four-bit symbols to the coherent optical receiver over the optical fiber.

The coherent optical receiver may receive traffic and may process the traffic (e.g., by performing equalization, carrier recovery, etc.) to recover the encoded four-bit symbols from the received traffic. The coherent optical receiver may also, or alternatively, use a 3QAM decoding mechanism (e.g., shown as a dashed box labeled "3QAM decoder") to decode the encoded four-bit symbols and/or to recover the four-bit symbols. The 3QAM decoding mechanism may be based on the 3QAM encoding mechanism that was used to encode the traffic to avoid creating errors when cycle slip occurs. The coherent optical receiver may use the 3QAM decoding mechanism to convert the recovered four-bit symbols to the three-bit 3QAM symbols.

Enabling the coherent optical system to transport the 3QAM traffic, may enable traffic to continue to be transported when sufficient system margin is not available to transmit the PM-QPSK traffic. Additionally, the 3QAM traffic may also allow the traffic to be transported at a higher data rate than the PM-BPSK traffic.

Figure 2:
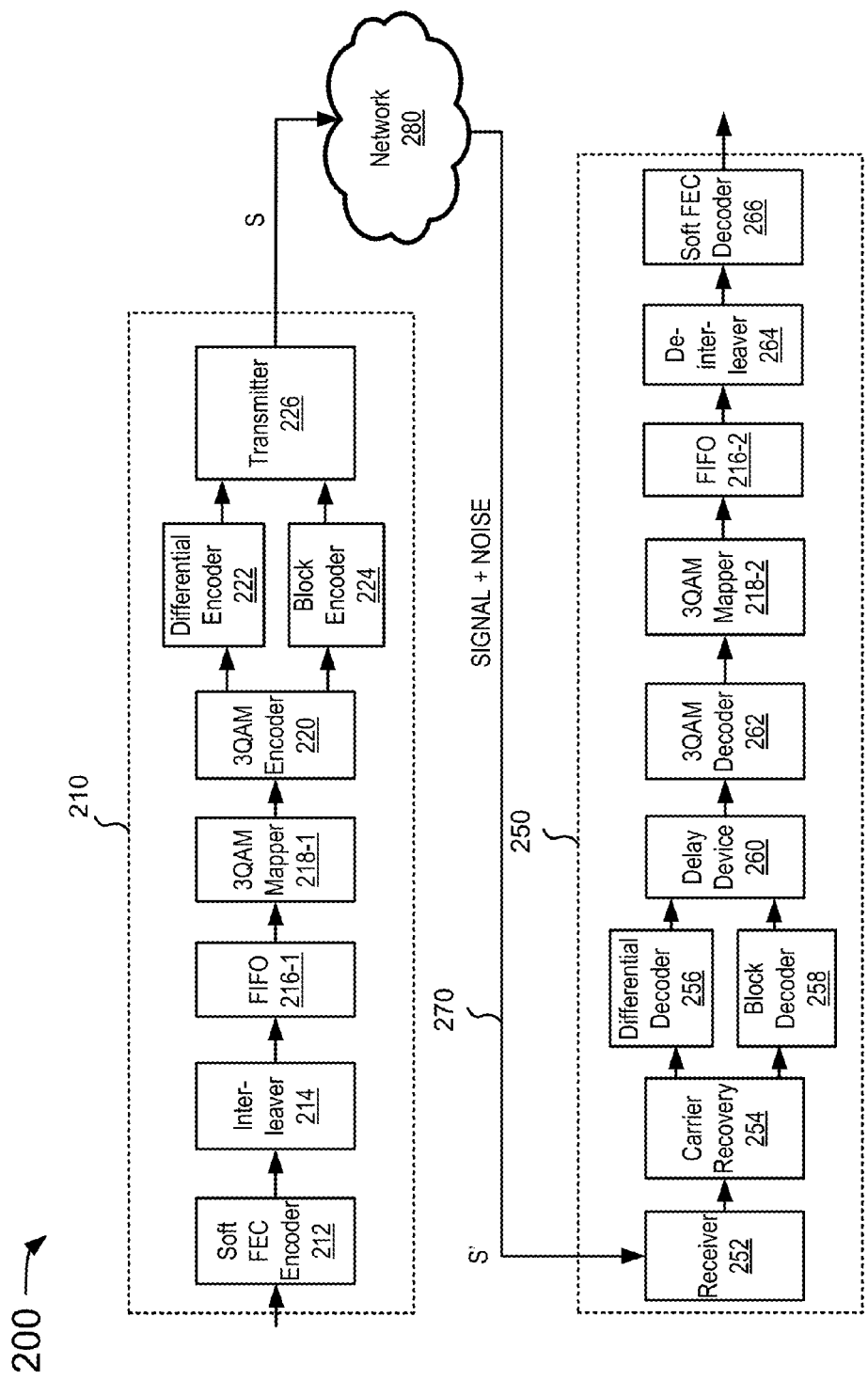
FIG. 2 is a block diagram of an example environment in which systems and/or methods described herein may be implemented.

FIG. 2 is a diagram of an example environment 200 in which systems and/or methods, described herein, may be implemented. Environment 200 may include an optical transmitter 210, an optical receiver 250, an optical fiber 270, and a network 280. Optical transmitter 210 may include one or more devices that generate, process, and/or transmit an optical signal. In an example implementation, optical transmitter 210 may be a network device, such as a network node, a coherent optical transmitter, and/or some other type of optical device. Optical transmitter 210 may include a soft forward error correction (FEC) encoder 212, an interleaver 214, a first-in-first-out (FIFO) component 216-1, a three-quadrature amplitude modulation (3QAM) mapper 218-1, a 3QAM encoder 220, a differential encoder 222, a block encoder 224, and a transmitter 226.

Soft FEC encoder 212 may include one or more components that perform forward error correction encoding on bits within a received signal. Soft FEC encoder 212 may, for example, use a forward error correction encoding mechanism to generate symbols that include one or more bits associate with error identification and/or correction. Soft FEC encoder 212 may provide the symbols to interleaver 214.

Interleaver 214 may include one or more components to perform interleaving of symbols. For example, interleaver 214 may receive symbols from soft FEC encoder 212 and may store symbols within alternating rows and/or columns of a memory associated with interleaver 214. In one example, interleaver 214 may store words (e.g., each including a set of symbols) within each row of interleaver 214 until interleaver 214 has reached capacity. Interleaver 214 may retrieve words, from each column of interleaver 214, and may provide the retrieved words to FIFO 216-1. In this example, each word, retrieved from a column, may include a symbol from each row within interleaver 214. Interleaver 214 may also, or alternatively, include one or more memories, possibly of different sizes (e.g., associated with a short interleaver component, a long interleaver component, etc.), that enable one or more interleaving operations to be performed on the symbols. The interleaving operation may enable a burst of errors (e.g., when an error rate associated with a set of symbols is greater than a threshold) to be spread out over a larger quantity of symbols. Spreading the errors over the larger quantity of symbols may reduce the error rate to a level that is not greater than the threshold, which enables the symbols to be processed and/or corrected by receiver 250.

FIFO 216-1 may include a memory that enables symbols to be processed using one or more clock speeds. For example, FIFO 216-1 may receive symbols from interleaver 214 and may store the symbols in a memory associated with FIFO 216-1. The symbols may be received and/or stored based on a first clock speed. Interleaver 214 may retrieve, from the memory, symbols and may provide the retrieved symbols to 3QAM mapper 218-1 based on a second clock speed. For example, FIFO 216-1 may receive a set of words from interleaver 214 (e.g., read from a set of columns of interleaver 214). In one example, the words may be received via lanes of bits (e.g., four lanes of bits) and/or bits streams. FIFO 216-1 may output the symbols in a same order in which the symbols were received based on the second clock rate.

For example, FIFO 216-1 may receive four words (e.g., via the four lanes of bits), each including 256 symbols, based on a first clock speed (e.g., F1). FIFO 216-1 may output four words, each including 192 symbols, at a second clock speed (e.g., F2) that is greater than the first clock speed. The change in word size may correspond to a ratio (e.g., 3/4) of a three-bit 3QAM symbol to a four-bit PM-QPSK symbol (e.g., 192 symbols=3/4*256 symbols). Similarly, the change in clock speed may correspond to the ratio (e.g., F1=3/4*F2). Thus, the incoming data rate (e.g., DR1=256*F1*4, where DR1 is the incoming data rate) may be approximately equal to the outgoing data rate (e.g., DR2=192*F2*4, where DR2 is the outgoing data rate).

3QAM mapper 218-1 may include one or more components that convert 3QAM traffic, associated with a format that can be processed by optical transmitter 210 (e.g., a four-bit PM-QPSK format), to a 3QAM scheme. For example, 3QAM mapper 218-1 may receive four words from FIFO 216-1 (e.g., associated with 192 symbols per word and at the second clock speed) and may obtain the symbols from the four words. 3QAM mapper 218-1 may, based on the symbols, output, to 3QAM encoder 220, three words that include a greater quantity of symbols (e.g., 256 symbols) than the received words. The three words may correspond to three-bit 3QAM symbols, such that a first symbol of a first word, a first symbol of a second word, and a first symbol of a third word may correspond to a first three-bit 3QAM symbol.

3QAM Encoder 220 may include one or more components that provide encoding of symbols. In one example, 3QAM encoder 220 may be a coherent encoder. 3QAM encoder 220 may, for example, receive a three-bit 3QAM symbol from 3QAM mapper 218-1 and may convert the three-bit 3QAM symbol to a four-bit symbol associated with a PM-QPSK format. 3QAM encoder 220 may, in one example, use a data structure, to be described in greater detail below in FIG. 3, to perform a lookup operation to identify the four-bit symbol that corresponds to the 3QAM symbol. 3QAM encoder 220 may provided the four-bit symbol to differential encoder 222 and/or block encoder 224

Differential encoder 222 may include one or more components that provide coherent encoding of four-bit symbols. For example, differential encoder 222 may receive a four-bit symbol from 3QAM encoder 220 and may output, to transmitter 226, a differentially encoded four-bit symbol. Differential encoder 222 may, in one example, perform differential encoding on bits associated with a first polarization (e.g., X polarization) to generate encoded bits associated with in-phase and quadrature components (e.g., XI and XQ, respectively). Similarly, differential encoder 222 perform differential encoding on bits associated with a second polarization (e.g., Y polarization) to generate encoded bits associated with in-phase and quadrature components (e.g., YI and YQ, respectively). The differentially encoded four-bit symbol may be based on a phase difference between the received four-bit symbols and a previously outputted four-bit symbol.

Block encoder 224 may include one include one or more components that provide coherent block encoding of words that are based on four-bit symbols. For example, block encoder 224 may receive a block of symbols, based on one or more words from 3QAM encoder 220 and may generate one or more control symbols associated with a reference phase. Block encoder 224 may insert the control symbols into the words to create one or more encoded words. Block encoder 224 may output the encoded word to transmitter 226.

Transmitter 226 may include one or more components that generate and/or transmit an optical signal. Transmitter 226 may generate an optical signal based on the symbols and/or samples received from differential encoder 222 and/or block encoder 224. Transmitter 226 may, in an example implementation, include a laser that generates an optical signal. Additionally, or alternatively, transmitter 226 may include a modulator that modulates the optical signal based on an input electrical signal (e.g., the symbols and/or words received from differential encoder 222 and/or block encoder 224). In one example, transmitter 226 may modulate the optical signal using PM-QPSK techniques. Additionally, or alternatively, transmitter 226 may include a multiplexer to multiplex the modulated optical signal (e.g., using wavelength-division multiplexing) for transmission, to optical receiver 250, via optical fiber 270 and/or network 280. The optical signal (e.g., S), output by transmitter 226, may include a stream of four-bit symbols.

Optical transmitter 210 may perform other operations on symbols in addition to, or instead of the operations described above. For example, optical transmitter 210 may cause a first pair of bits (e.g., associated with X polarization), within a four-bit symbol, to be delayed relative to a second pair of bits (e.g., associated with a Y polarization) associated with the four bits symbols. Delaying the first pair of bits relative to the second pair of bits may enable optical receiver to process (e.g., perform equalization, etc.) the first pair of bits at a different point in time than the second pair of bits. Processing the pairs of bits at different times may enable a condition, associated with four-bit symbols received by optical receiver 250, to be restored to a condition that existed prior to being transmitted by optical transmitter 210.

Optical receiver 250 may include one or more devices that receive optical signals, process the optical signals, convert the optical signals to electrical signals, perform processing on the electrical signals, and/or output the processed electrical signals. In an example implementation, optical receiver 250 may be a network device, such as a network node, a coherent optical receiver and/or some other type of optical device. Optical receiver 250 may include a receiver 252, a carrier recovery component 254, a differential decoder 256, a block decoder 258, a delay device 260, a 3QAM decoder 262, a 3QAM mapper 218-2, a FIFO 216-2, a de-interleaver 264, and a soft FEC decoder 266.

Optical receiver 250 may receive a signal (e.g., S') from optical transmitter 210 via optical fiber 270 and/or network 280. The received signal may include the transmitted signal (e.g., S) and a quantity of noise (e.g., phase noise, polarization noise, phase noise, and/or some other type of noise) as a result of transmission from optical transmitter 210 to optical receiver 250 (e.g., due to imperfections within optical fiber 270 and/or noise from amplifiers, network nodes, etc., associated with network 280).

Receiver 252 may include one or more components that receive, convert, process, amplify, and/or demodulate signals in a manner described herein. Receiver 252 may include a photo detector (e.g., a photo diode) that receives an optical signal. Additionally or alternatively, receiver 252 may include a de-multiplexer (demux) that de-multiplexes the optical signal (e.g., using wave-division de-multiplexing) into one or more optical signals for processing. In an example implementation, receiver 252 may be a coherent optical receiver that receives and/or processes a phase-modulated optical signal (e.g., PM-QPSK, etc.). Receiver 252 may, for example, process the signal to break the optical signal into constituent polarization components (e.g., X and Y polarizations), in-phase and/or quadrature components (e.g., I and/or Q, respectively), etc. Receiver 252 may demodulate the components to create electrical signals and may convert the electrical signals from analog signals to digital signals. Receiver 252 may include an equalizer component that amplifies and/or attenuates particular frequencies, associated with the signals, to preserve and/or reshape a wave form associated with the signals.

Carrier recovery 254 may include one or more components to perform carrier recovery on symbols. Carrier recovery 254 may, for example, perform carrier recovery operations on four-bit symbols within traffic received from receiver 252. In one example, carrier recovery 254 may perform the carrier recovery operation using techniques that are used to process PM-QPSK symbols. The carrier recovery operation may identify and/or track phase noise associated with the received symbols and/or may recover encoded four-bit symbols from the traffic. The carrier recovery operation may, however, cause cycle slips to occur in the traffic, which may cause all or a portion of the four-bit symbols to become corrupted with errors (e.g., bit errors, symbols errors, etc.). Carrier recovery 254 may output a stream of encoded four-bit symbols. In one example, the four-bit symbols may be outputted on one or more different channels, such as a first channel over which symbols associated with a first polarization (e.g., X-polarization) and an in-phase component (e.g., I) are transmitted (e.g., XI); a second channel over which symbols associated with the first polarization and a quadrature component (e.g., Q) are transmitted (e.g., XQ); a third channel over which symbols associated with a second (e.g., Y polarization) and the in-phase component are transmitted (e.g., YI); and/or a fourth channel over which symbols associated with the second polarization and the quadrature component are transmitted (e.g., YQ).

Differential decoder 256 may include one or more components that provide differential decoding of adjacent four-bit symbols. In one example, block decoder 256 may perform the differential decoding operation using techniques that are used to process PM-QPSK symbols. For example, differential decoder 256 may receive a differentially encoded four-bit symbol from carrier recovery 254 and may output, to delay device 260, a decoded four-bit symbol. The decoded four-bit symbol may be generated based on a phase difference between the encoded four-bit symbol and a previously received encoded four-bit symbol that is adjacent to the encoded four-bit symbol. Differential decoder 256 may use differential decoding techniques that are related to the differential encoding techniques employed by differential encoder 222.

Block decoder 258 may include one or more components that provide coherent block decoding of blocks of four-bit symbols. In one example, block decoder 258 may perform the block decoding operation using techniques that are used to process PM-QPSK symbols. For example, block decoder 258 may receive a word or block of symbols from carrier recovery 254 and may obtain one or more control symbols from the word and/or block of symbols. Block decoder 258 may compare a phase associated with the control symbols to a reference phase (e.g., used by block encoder 224 to generate the control symbols) and may reset the symbols, within the word, based on the difference between the phase and the reference phase. Block decoder 258 may provide the decoded four-bit symbols to delay device 260.

Delay device 260 may include one or more components that enable four-bit symbols, received via different channels (e.g., associated with XI, XQ, YI, and YQ) to be synchronized with respect to time. For example, delay device 260 may receive one or more four-bit symbols via the different channels at different points in time and may output the received four-bit symbols to 3QAM decoder 262 at approximately a same point in time.

3QAM decoder 262 may include one or more components that generate 3QAM symbols based on received four-bit symbols. In one example, 3QAM decoder 262 may be a coherent decoder. 3QAM decoder 262 may, for example, receive a four-bit symbol (e.g., a PM-QPSK symbol) from delay device 260 and may convert the four-bit symbol to a three-bit 3QAM symbol. 3QAM decoder 262 may, in one example, use a data structure, to be described in greater detail below in FIG. 3, to perform a lookup operation to identify the three-bit symbol that corresponds to the received four-bit symbol. 3QAM decoder 262 may provided the 3QAM symbol to 3QAM mapper 218-2.

3QAM mapper 218-2 may include one or more components that convert 3QAM traffic into a format that can be processed by optical receiver 250 using PM-QPSK techniques (e.g., such as those used by FIFO 216-2, de-interleaver 264, soft FEC decoder 266, etc.). In one example, 3QAM mapper 218-2 may use a pattern, which represents a reverse of the pattern used by 3QAM mapper 218-1, to convert the traffic. For example, 3QAM mapper 218-2 may receive three words, based on 3QAM symbols, via three channels from 3QAM decoder 262 (e.g., associated with 256 symbols per word and at the second clock speed, F2) and may obtain symbols from the three words. 3QAM mapper 218-2 may, based on the symbols, output, to FIFO 216-2, four words that include a fewer symbols (e.g., 192 symbols) than the received words. The four words may correspond to 3QAM symbols, such that a first symbol of a first word, a first symbol of a second word, and a first symbol of a third word may correspond to a first three-bit 3QAM symbol.

FIFO 216-2 may include a one or more components that enable received words to be output at a reduced clock speed and/or an increased word size that can be processed by optical receiver 250. For example, FIFO 216-2 may receive words (e.g., based on 192 symbols per word) from 3QAM mapper 218-2 and may store the words in a memory associated with FIFO 216-2. The words may be received and/or stored based on a second clock speed (e.g., the second clock speed used by FIFO 216-1). FIFO 216-2 may retrieve, from the memory, different sized words (e.g., based on 256 symbols per word) and may provide the retrieved words to de-interleaver 264 based on the first clock speed (e.g., the first clock speed used by FIFO 216-1) that is less than the second clock speed. The words may be received and outputted at a same data rate.

De-interleaver 264 may include one or more components to perform de-interleaving of symbols. In one example, de-interleaver 264 may perform de-interleaving on four-bit symbols, received from FIFO 216-2, based on a de-interleaving pattern that is a reverse of an interleaving pattern used by interleaver 214. Using the de-interleaving pattern may allow the four-bit symbols to be retrieved in an order that existed prior to the symbols being interleaved by interleaver 214. De-interleaver 264 may, for example, receive symbols from FIFO 216-2 and may store the symbols within alternating rows and/or columns of a memory associated with de-interleaver 264. De-interleaver 264 may retrieve the symbols from alternating columns and/or rows and may provide the retrieved symbols to soft FEC decoder 266. De-interleaver 264 may also, or alternatively, include one or more memories, possibly of different sizes (e.g., associated with a short de-interleaver component, a long de-interleaver component, etc.), that correspond to one or more memory sizes associated with interleaver 214 (e.g., associated with a short interleaver, a long interleaver, etc., respectively).

Soft FEC decoder 266 may include one or more components that perform forward error correction decoding of symbols. Soft FEC decoder 266 may, for example, use a forward error correction decoding mechanism to identify and/or correct errors identified within symbols received from de-interleaver 264. The decoding mechanism may be related to the forward error correction encoding mechanism used by soft FEC encoder 212 to encode the symbols. Soft FEC decoder 266 may output the decoded symbols.

Optical fiber 270 may correspond to an optical fiber, a fiber optic cable, a fiber plant, etc. Network 280 may include one or more fiber optic-based networks (e.g., such as a fiber plant that provides long haul transmission of optical signals), and/or or a combination of fiber optic networks and other types of networks, such as a wired and/or wireless network.

The quantity of devices, components, and/or networks, illustrated in FIG. 2, is provided for explanatory purposes. In practice, there may be additional devices, components, and/or networks; fewer devices, components, and/or networks; different devices, components, and/or networks; or differently arranged devices, components, and/or networks than illustrated in FIG. 2. Also, in some implementations, one or more of the devices and/or components, of environment 200 may perform one or more functions described as being performed by another one or more of the devices and/or components of environment 200.

FIG. 3 is a diagram of an example data structure 300 that stores information that associates three-bit 3QAM symbols with four-bit PM-QPSK symbols. Data structure 300 may be stored in a storage device associated with 3QAM encoder 220 or 3QAM decoder 262. Data structure 300 may include a collection of fields, such as a 3QAM symbol field 305, a X polarization (X pol)/in-phase bit field 310, a X pol/quadrature (quad) bit field 315, a Y polarization (Y pol)/in-phase bit field 320, and a Y pol/quad bit field 325. A quantity of fields, shown within data structure 300, is included for explanatory purposes. In other implementations, there may be additional fields, fewer fields, different fields, or differently arranged fields than are shown with respect to FIG. 3.

3QAM symbol field 305 may store a set of values that corresponds to amplitudes of a three-bit 3QAM symbol. For example, 3QAM techniques may provide three bits per symbol (e.g., N=3) resulting in eight different bit combinations (e.g., $2^N=8$ when N=3) or eight different 3QAM symbols (e.g., shown as 000, 001, 010, 011, 100, 101, 110, and 111 by ellipse 327). 3QAM symbol field 305 may, thus, store one of eight different sets of values that correspond to one of eight different three-bit 3QAM symbols.

X pol/in-phase bit field 310 may store a value that corresponds to an amplitude of an in-phase component, associated with a first polarization (e.g., X polarization), of a particular PM-QPSK symbol. The value may correspond to a first value (e.g., 1 or some other first value) or a second value (e.g., −1 or some other second value). X pol/quad bit field 315 may store a first or second value that corresponds to an amplitude of a quadrature component, associated with the first polarization, of the particular PM-QPSK symbol. Y pol/in-phase bit field 320 may store a first or second value that corresponds to an amplitude of a quadrature component, associated with a second polarization, of the particular PM-QPSK symbol. Y pol/quad bit field 325 may store a first or second value that corresponds to an amplitude of a quadrature component, associated with the second polarization, of the particular PM-QPSK symbol.

Thus, the particular PM-QPSK symbol may include the values stored by X pol/in-phase bit field 310, X pol/quad bit field 315, Y pol/in-phase bit field 320, and Y pol/quad bit field 325. Furthermore, the particular PM-QPSK symbol may include four bits per symbol (e.g., N=4) resulting in 16 different bit combinations (e.g., $2^N=16$ when N=4). The values associated with the four-bit combinations may define a modulation state (e.g., a PM-QPSK state) of a symbol in a manner to be described in greater detail below with respect to FIG. 4.

By way of example, 3QAM symbol field 305 may store a first set of three values (e.g., 000), associated with a first 3QAM symbol, that may correspond to a first set of four values, stored within fields 310-325, associated with a first four-bit symbol (e.g., −1, −1, −1, −1 as shown by ellipse 329); a second set of three values (e.g., 001), associated with a second 3QAM symbol, that may correspond to a second set of four values (e.g., −1, −1, 1, 1 as shown by ellipse 331); and up through an eighth set of four values (e.g., 111), associated with a eighth 3QAM symbol, that may correspond to an eight set of four values (e.g., 1, 1, 1, 1 as shown by ellipse 333). Thus, each 3QAM symbol, identified by the sets of three values stored within 3QAM field 305, may correspond to a respective different four-bit symbol identified by the sets of four values stored within fields 310-325.

Additionally, or alternatively, some of the 16 possible four-bit symbols may not be associated with a 3QAM symbol (e.g., shown by the shaded rows within FIG. 3). Thus, even though the sets of four values represent a valid PM-QPSK symbol, some of the sets of four values may not be used for processing 3QAM symbols. Optical receiver 250 may cause an error to occur if a PM-QPSK symbol, that does not correspond to a 3QAM symbol, is used to process 3QAM traffic.

Additionally, or alternatively, a first difference between adjacent sets of four values of PM-QPSK symbols may be less than a second difference between sets of four values of PM-QPSK symbols that correspond to adjacent 3QAM symbols. For example, a first difference between a first PM-QPSK symbol (e.g., 1, −1, 1, −1) and a second, adjacent PM-QPSK symbol (e.g., 1, −1, 1, 1) may be represented by a first distance (e.g., a Euclidean distance, etc.) that corresponds to a first value (e.g., shown as $\Delta D1^2 \geq 4$, where $\Delta D1^2$ represents a square of the first distance). Additionally, or alternatively, a second difference between a third PM-QPSK symbol (e.g., 1, −1, −1, 1) associated with a first 3QAM symbol (e.g., 101) and a fourth PM-QPSK symbol (e.g., 1, 1, −1, −1) associated with a second, adjacent 3QAM symbol (e.g., 110) may be represented by a second distance that corresponds to a second value (e.g., shown as $\Delta D2^2 \geq 8$, where $\Delta D2^2$ represents a square of the second distance). The second distance being greater than the first distance may, in a manner to be described in greater detail below with respect to FIG. 5, enable optical receiver 250 to recover 3QAM symbols from traffic. This feature may enable 3QAM symbols to be more tolerant to noise than PM-QPSK symbols.

Figure 4:
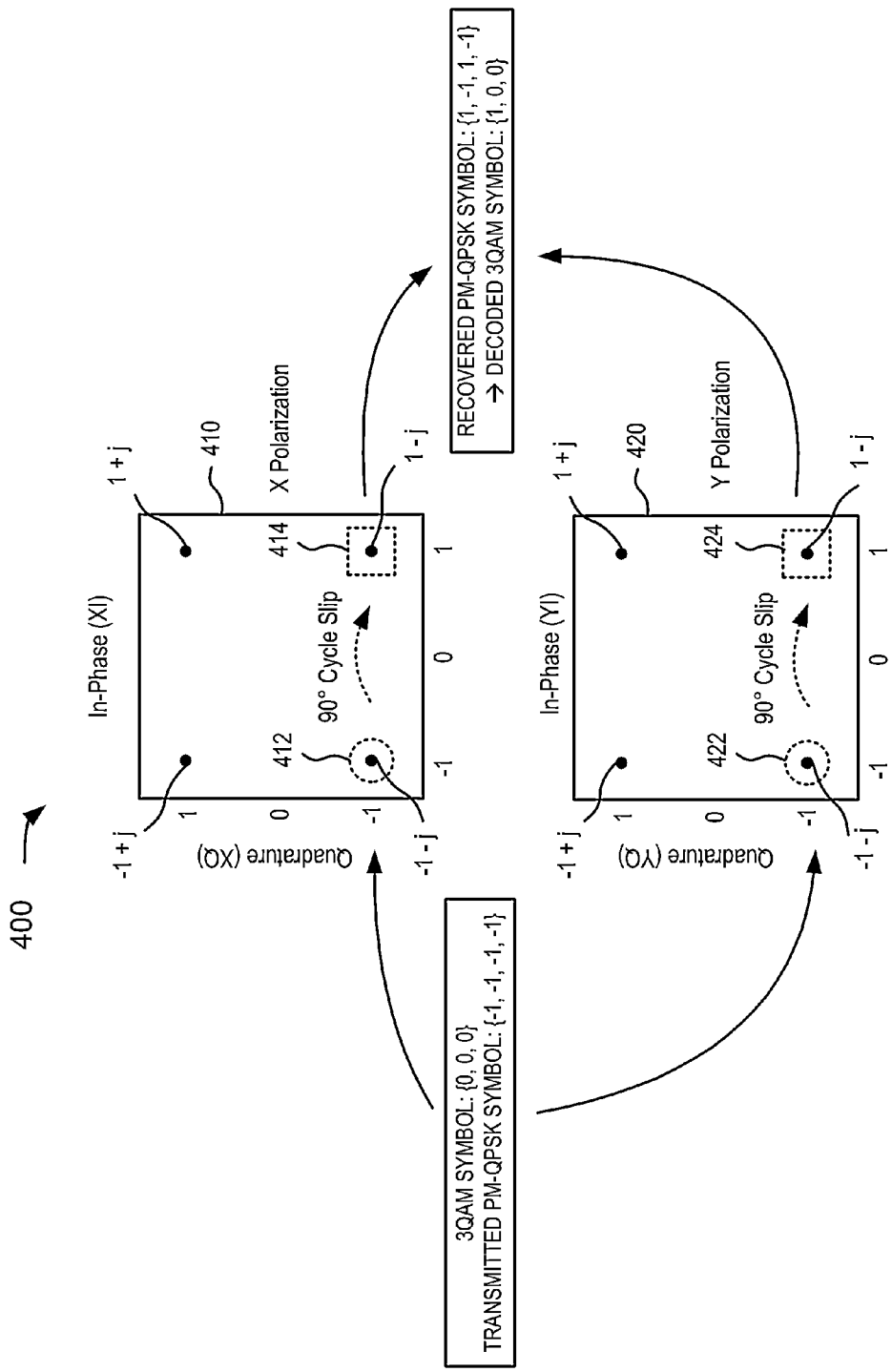
FIG. 4 is a diagram of example modulation states associated with four-bit symbols being processed by an optical receiver of FIG. 2.

FIG. 4 is a diagram of example modulation states 400 associated with four-bit symbols being processed by optical receiver 250. As illustrated in FIG. 4, modulation states 400 may include a first modulation state 410 associated with a first polarization (e.g., shown as X polarization) and a second modulation state 420 associated with a second polarization (e.g., shown as Y polarization). First modulation state 410 and/or second modulation state 420 may correspond to a state in which four-bit PM-QPSK symbols can be processed, by optical receiver 250, to recover three-bit 3QAM symbols.

First modulation state 410 and second modulation state 420 may identify a range of amplitudes (e.g., −1 to +1 or some other range) associated with a quadrature component (e.g., shown as "Quadrature (Q)" on a vertical axis of first modulation state 410 and second modulation state 420) and a range of amplitudes (e.g., −1 to +1 or some other range) associated with an in-phase component (e.g., shown as "In-Phase (I)" on a horizontal axis of first modulation state 410 and second modulation state 420). First modulation state 410 may identify four possible states associated with X-polarized bits of a four-bit PM-QPSK symbol. A first state may correspond to a negative in-phase component and a positive quadrature component (e.g., −1+j); a second state may correspond to a positive in-phase component and a positive quadrature phase component (e.g., 1+j); a third state may correspond to a positive in-phase component and a negative quadrature component (e.g., 1−j); and a fourth state may correspond to a negative in-phase component and a negative quadrature phase component (e.g., −1−j).

Second modulation state 420 may identify four possible states associated with Y-polarized bits of a four-bit PM-QPSK symbol. A first state may correspond to a negative in-phase component and a positive quadrature component (e.g., −1+j); a second state may correspond to a positive in-phase component and a positive quadrature phase component (e.g., 1+j); a third state may correspond to a positive in-phase component and a negative quadrature component (e.g., 1−j); and a fourth state may correspond to a negative in-phase component and a negative quadrature phase component (e.g., −1−j).

By way of example, optical transmitter 210 may encode a 3QAM symbol (e.g., 0, 0, 0) as a four-bit PM-QPSK symbol (e.g., −1, −1, −1, −1) based on the data structure 300 of FIG. 3. The four-bit PM-QPSK symbol may correspond to a modulation state (e.g., −1−j in X polarization as shown by dashed circle 412 and −1−j in Y polarization dashed circle 422). Optical transmitter 210 may transmit the four-bit PM-QPSK symbol and optical receiver 250 may receive the four-bit PM-QPSK symbol that has been corrupted by noise (e.g., due to transmission over optical fiber 270 and/or via network 280). For example, the noise may cause the received four-bit symbol to have a different phase angle, polarization angle, amplitude, etc. than what existed before transmission. In one example, the four-bit symbol may experience a phase shift that occasionally causes the four-bit symbol to resemble a valid PM-QPSK symbol (e.g., when the phase shift corresponds to integer multiples of 90 degrees: 90 degrees, 180 degrees, 270 degrees, etc.) associated with a different modulation state (e.g., 1−j in X polarization as shown by dashed square 414 and 1−j in Y polarization as shown by dashed square 424). Thus, optical receiver 250 may perform carrier recovery on the received four-bit symbol and may recover a different four-bit PM-QPSK symbol (e.g., 1, −1, 1, −1) than what was transmitted. The recovered PM-QPSK symbol may, when decoded (e.g., by 3QAM decoder 264), cause a different 3QAM signal to be decoded (e.g., 1, 0, 0) which may cause errors to occur in traffic being processed by optical receiver 250.

Figure 5:
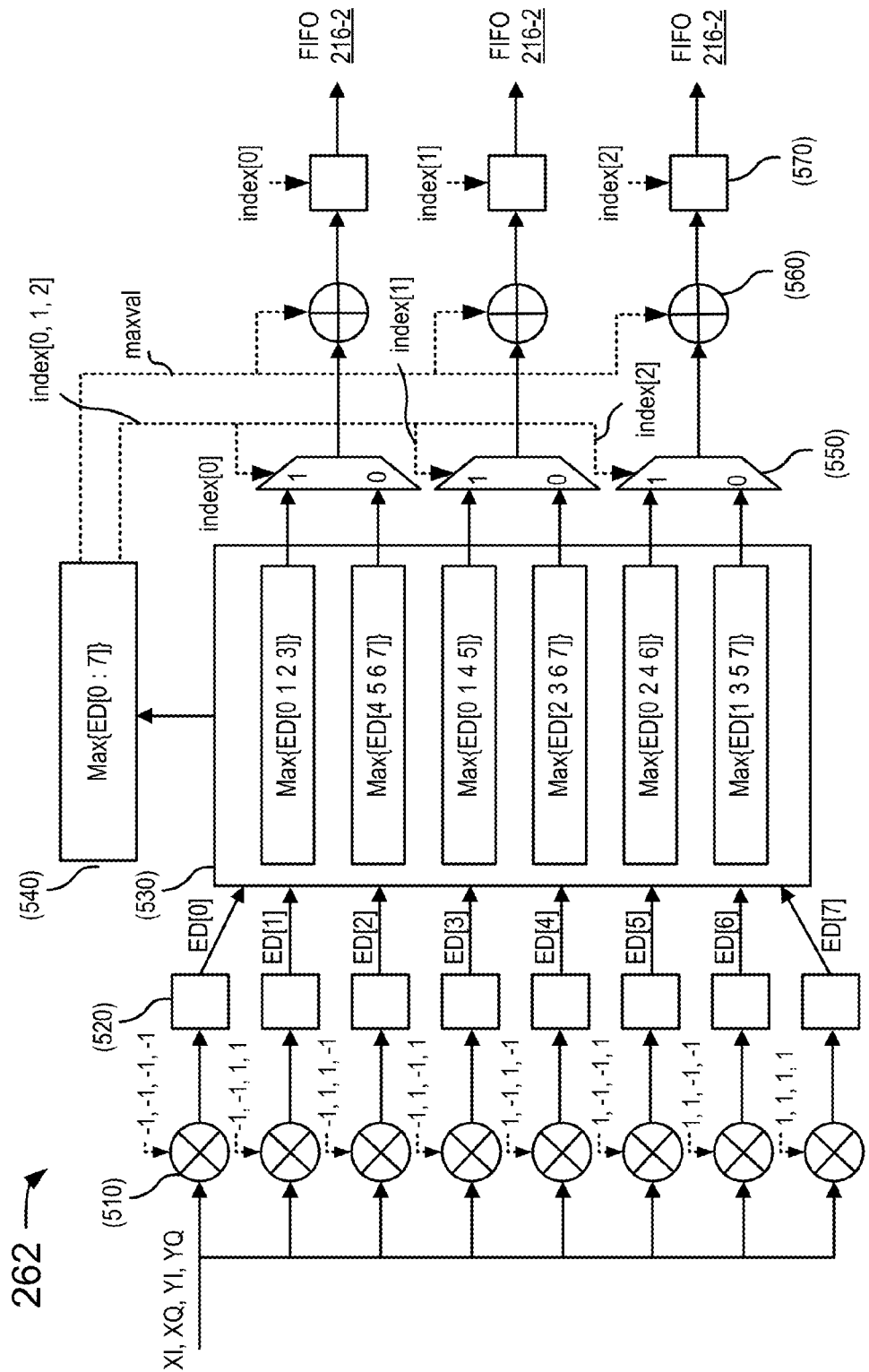
FIG. 5 is a diagram of example components of a 3QAM decoder of FIG. 2.

FIG. 5 is a diagram of example components of 3QAM decoder 262. As shown in FIG. 5, 3QAM decoder 262 may include a group of multipliers 510 (hereinafter referred to collectively as "multipliers 510" and individually as "multiplier 510"), a group of distance components 520 (hereinafter referred to collectively as "distance components 520" and individually as "distance component 520"), a distance processor 530, an index component 540, a set of muxponder components 550 (hereinafter referred to collectively as "mux components 550" and individually as "mux component 550"), a group of mixers 560 (hereinafter referred to collectively as "mixers 560" and individually as "mixer 560"), and a group of decision components 570 (hereinafter referred to collectively as "decision components 570" and individually as "decision component 570"). Components 510-570, of 3QAM decoder 262, are included for explanatory purposes. In other implementations, there may be additional components, fewer components, different components, or differently arranged components than shown in FIG. 5.

Multiplier 510 may multiply two or more signals to create a combined signal. For example, multiplier 510 may receive a four-bit symbol and may, on a per-bit basis, multiply the four-bit symbol by a four-bit QPSK symbol that corresponds to one of eight possible 3QAM symbols to create a combined signal. Multiplier 510 may provide the combined four-bit symbol to distance component 520. Distance component 520 may determine a distance associated with a combined signal. Distance component 520 may, for example, receive combined signal and may determine a distance (e.g., a Euclidean distance and/or some other distance) based on bits associated with a symbol obtained from the combined signal. Distance component 520 may output, to distance processor 530, a distance value that corresponds to the distance. The distance value may, for example, be determined by adding each of the bits associated with a symbol obtained from the combined signal. The distance may represent a difference between the received symbol (e.g., received from delay device 260) and the four-bit QPSK symbol. Additionally, or alternatively, each distance value may represent a level of reliability associated with the received symbol. Thus, the greater the distance, the greater probability that the received symbol corresponds to a four-bit symbols associated with one of the eight possible 3QAM symbols.

Distance processor 530 may determine one or more greatest distances from a set of received distance values. For example, distance process 530 may receive a set of distances values from each distance component 520. The distances values may identify a respective distance between a received four-bit symbol and each four-bit PM-QPSK symbol associated with the eight possible 3QAM symbols (e.g., shown as ED[0]-ED[7], where ED stands for Euclidean distance). Distance processor 530 may determine a first greatest distance value among a first subset (e.g., first four distance values) of the distance values (e.g., Max{ED[0 1 2 3]}; a second greatest distance value among a second subset (e.g., a second four distance values) of the distance values (e.g., Max{ED[4 5 6 7]}; etc. for each possible of combination of four of the distance values. Distance processor 530 may provide, a first pair of greatest distance values (e.g., a first greatest distance value and a second greatest distance value) to a first mux component 550; a second pair of greatest distance values (e.g., a third greatest distance value and a fourth greatest distance value) to a second mux component 550; and/or a third pair of greatest distance values (e.g., a fifth greatest distance value and a sixth greatest distance value) to a third mux component 550. Distance processor 530 may provide the set of distance values (e.g., received from distance components 520) to index component 540.

Distance processor 530 may also, or alternatively, identify an index value that identifies which of the set of distance values is greatest. For example, when the first distance value (e.g., ED[0]) is greater than the other distance values (e.g., ED[1]-ED[7]), distance processor 530 may provide, to index component 540, an index value, based on a quantity bits, that identifies the first distance value (e.g., 000); when the second distance value (e.g., ED[1]) is the greatest distance value, distance processor 530 may provide another index value (e.g., 001); and so on.

Index component 540 may determine a greatest distance value and/or an index value. For example, index component 540 may receive, from distance processor 530, the set of distance values and may identify a greatest distance value of the set of distance values. Index component 540 may output the greatest distance value (e.g., shown as maxval) to mixers 560.

Index component 540 may also, or alternatively, identify an index value that identifies which of the distance values is the greatest distance value and may output index values to mux components 550 and/or decision components 570. The index value may identify to which of the eight four-bit symbol patterns (e.g., that correspond to 3QAM symbols) the received four-bit symbol most closely corresponds (e.g., based on the index value). In one example, if index component 540 determines that ED[1] is greater than ED[0] and ED[2]-ED[7], index component 540 may identify an index value associated with ED[1] (e.g., 0,0,1). Thus, index component 540 may output a first index value (e.g., index[0]) that is equal to the first bit of the index value (e.g., index[0]=0); a second index value (e.g., index[1]) that is equal to the second bit of the index value (e.g., index[1]=0); and/or a third index value (e.g., index[2]) that is equal to the third bit of the index value (e.g., index[2]=1).

Mux component 550 may provide multiplexing of signals. For example, mux component 550 may receive a pair of greatest distance values from distance processor 530 and the index value from index component 540. Mux component 550 may, based on the index value, output one of the pair of greatest distance values to mixer 560. In one example, a first mux component 550 may receive a first pair of greatest distance values (e.g., associated with Max{ED[0 1 2 3]} and Max{ED[4 5 6 7]}) and a first index value (e.g., index[0]=0) that is based on a particular index value (0,0,1). Based on the first index value, the first mux component 550 may output a second greatest distance value, based on a distance (e.g., Max{ED[4 5 6 7]}, that is different than a particular greatest distance (e.g., ED[1]). A second mux component 550 may receive a second pair of greatest distance values (e.g., associated with Max{ED[0 1 4 5]} and Max{ED[2 3 6 7]}) and the second index value (e.g., index[1]=0). Based on the second index value, the second mux component 550 may output a fourth greatest distance value, based on a distance (e.g., Max{ED[2 3 6 7]}, that is different than the particular greatest distance (e.g., ED[1]). A third mux component 550 may receive a third pair of greatest distance values (e.g., associated with Max{ED[0 2 4 6]} and Max{ED[1 3 5 7]}) and the third index value (e.g., index[2]=1). Based on the third index value, the third mux component 550 may output a fifth greatest distance value, based on a distance (e.g., Max{ED[0 2 4 6]} that is different than the particular greatest distance (e.g., ED[1]).

Mixer 560 may combine received signals to create a combined signal. For example, mixer 560 may receive a greatest distance value from mux component 550 and a different greatest distance value (e.g., maxval) from index component 540. Mixer 560 may combine the greatest distance value and the different greatest distance value to create a combined signal. The combined signal may represent to a level of reliability associated with a bit within a 3QAM symbol to be outputted by 3QAM decoder 262. Thus, when combined signal corresponds to a value that is less than a reliability threshold (e.g., 0≤CS<R, where CS represents the value of the combined signal and R represents the reliability threshold) the level of reliability of a bit within the 3QAM symbol may correspond to a low level of reliability. Additionally, or alternatively, when combined signal corresponds to a value that is not less than the reliability threshold (e.g., R≤CS) the level of reliability of a bit, within the 3QAM symbol, may correspond to a high level of reliability.

In one example, a first mixer 560 may, from the example above, receive the second greatest distance value (e.g., Max{ED[4 5 6 7]} from the first mux component 550 and the greatest distance value (e.g., maxval associated with ED[1]) from index component 540. The first mixer 560 may, for example, subtract the second greatest distance value from the greatest distance value to generate a first combined value. The first mixer 560 may output the first reliability value to a first decision component 570. In this example, the first reliability value may not be equal to zero because the second greatest distance value is not equal to the greatest distance value. A second mixer 560 may receive the fourth greatest distance value (e.g., Max{ED[2 3 6 7]}) from the second mux component 550 and the greatest distance value (e.g., maxval) from index component 540. The second mixer 560 may, for example, subtract the fourth greatest distance value from the greatest distance value to generate a second reliability value. The second mixer 560 may output the second reliability value to a second decision component 570. In this example, the second reliability value may not be equal to zero because the fourth greatest distance value is not equal to the greatest distance value. A third mixer 560 may, similarly, output a third reliability value to a third decision component 570 that is not equal to zero because the fifth greatest distance value (e.g., Max{ED[0 2 4 6]}) is not equal to the greatest distance value.

Decision component 570 may output bits associated with a 3QAM symbol. For example, decision component 570 may receive a combined signal, associated with a reliability value (e.g., CS), from mixer 560 and an index value from index component 540 and may invert the reliability value when the index value is equal to a first value (e.g., 0 and/or some other first value). Decision component 570 may also, or alternatively, not invert the reliability value when the index value is equal to a second value (e.g., 1 and/or some other second value).

In one example, a first decision component 570 may receive the first combined signal, associated with a first reliability value (e.g., CS1), from the first mixer 560 and the first index value (e.g., index[0]=0) from index component 540. The first decision component 570 may determine that the first index value is equal to the first value. Based on the determination that the first index value is equal to the first value, first decision component 570 may invert the first reliability value (e.g., e.g., −CS1) and may output the inverted first reliability value that is associated with a first bit of a 3QAM symbol.

A second decision component 570 may also, or alternatively, receive the second combined signal, associated with a second reliability value (e.g., CS2), from the second mixer 560 and the second index value (e.g., index[1]=0) from index component 540. The second decision component 570 may determine that the second index value is equal to the first value. Based on a determination that the second index value is equal to the first value, the second decision component 570 may invert the second reliability value (e.g., −CS2) and may output the inverted second reliability value that is associated with a second bit of a 3QAM symbol.

Figure 6:
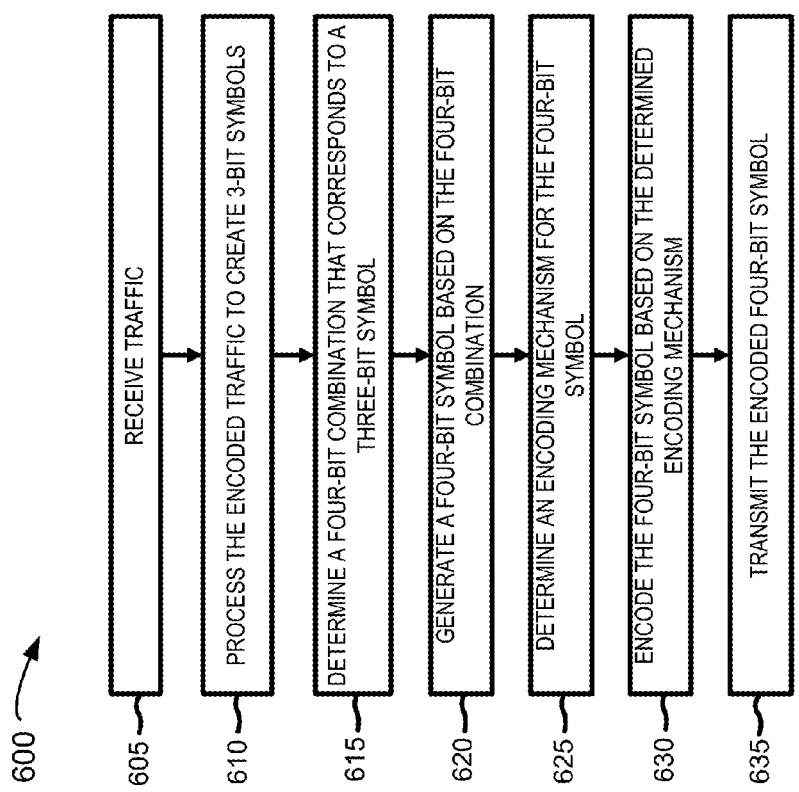
FIG. 6 is a flow chart of an example process for transmitting 3QAM traffic that is encoded based on a four-bit phase modulation scheme.

A third decision component 570 may also, or alternatively, receive the third combined signal, associated with a third reliability value (e.g., CS3) from the third mixer 560 and the third index value (e.g., index[2]=1) from index component 540. The third decision component 570 may determine that the third index value is equal to the second value. Based on a determination that the third index value is equal to the second value, third decision component 570 may not invert the third reliability value and may output the third reliability value to be associated with a third bit of a 3QAM symbol FIG. 6 is a flow chart of an example process for transmitting 3QAM traffic that is encoded based on a four-bit phase modulation scheme. In one example implementation, process 600 may be performed by optical transmitter 210. Alternatively, or additionally, some or all of process 600 may be performed by a device or collection of devices separate from, or in combination with, optical transmitter 210.

As shown in FIG. 6, process 600 may include receiving traffic (block 605) and processing the traffic to create three-bit symbols (block 610). For example, optical transmitter 210 may receive a signal that is to be transmitted to optical receiver 250. Optical transmitter 210 (e.g., soft FEC encoder 212) may encode bits, obtained from the signal, using a soft forward error correction mechanism to create symbols. In one example, each symbol may, as a result of the encoding, include a particular quantity of bits that can be processed, by transmitter 210 and/or optical receiver 250, using a four-bit phase modulation scheme (e.g., PM-QPSK modulation scheme).

Optical transmitter 210 (e.g., interleaver 214) may also, or alternatively, perform one or more interleaving operations on symbols in a manner similar to that described above with respect to FIG. 2. The interleaving operation may be based on an interleaving pattern that identifies one or more word sizes (e.g., based on one or more quantities of symbols) and/or a manner in which words are to be stored in, and/or retrieved from, rows and/or columns within one or more memories associated with optical transmitter 210.

Optical transmitter 210 may process interleaved symbols to create three-bit symbols associated with a 3QAM format. For example, optical transmitter 210 may process words, based on the interleaved symbols, using four symbol streams and/or channels (e.g., associated with XI, XQ, YI, and YQ components). Additionally, or alternatively, optical transmitter 210 (e.g., FIFO 216-1) may increase a clock speed with which the words are processed (e.g., from F1, with which the symbols are received, to F2 with which symbols are outputted by FIFO 216-1) based on a ratio between a three-bit 3QAM symbol format and the four-bit symbol format (e.g., where F1=3/4*F2) associated with the four-bit phase modulation scheme. Additionally, or alternatively, optical transmitter 210 may reduce a word size used to process the symbols (e.g., from 256 symbols per word received from interleaver 214 to 192 symbols per word outputted by FIFO 216-1). The reduction in the word size may be based on the ratio between the three-bit 3QAM symbol format and the four-bit symbol format (e.g., where 192=3/4*256). Optical transmitter 210 may increase the clock speed and/or reduce the word size in a manner that does not change a data rate (e.g., a bit rate, a throughput rate, a symbol rate, etc.) associated with the symbols.

Optical transmitter 210 (e.g., 3QAM mapper 218-1) may, in a manner similar to that described above with respect to FIG. 2, convert the four symbol streams and/or channels to three symbols streams and/or channels. Optical transmitter 210 may, for example, convert the four symbol streams and/or channels to the three symbol streams and/or channels based on a mapping mechanism. Thus, a first symbol within a first stream, a first symbol within a second stream, and a first symbol within a third stream may represent a three-bit 3QAM symbol. Optical transmitter 210 may also, or alternatively, increase the word size used to process the three-bit symbols (e.g., from 192 symbols per word to 256 symbols per word) based on the ratio between the three-bit 3QAM symbol format and the four-bit symbol format. Optical transmitter 210 may create the three-bit symbols and/or increase the word size in a manner that does not change a data rate (e.g., a bit rate, a throughput rate, a symbol rate, etc.) at which optical transmitter 210 is processing traffic based on the three-bit symbols.

As also shown in FIG. 6, process 600 may include determining a four-bit combination that corresponds to a three-bit symbol (block 615) and generating a four-bit symbol based on the four-bit combination (block 620). For example, optical receiver 210 (e.g., 3QAM encoder 220) may obtain a first symbol from each word associated with the respective three symbol streams and/or channels, associated with a three-bit symbol. Optical transmitter 210 may also, or alternatively, determine a four-bit combination that corresponds to the three-bit symbol. In one example, optical receiver 210 may access a data structure (e.g., data structure 300 of FIG. 3) to identify a three-bit symbol, stored within the data structure, that matches the three-bit symbol. Optical transmitter 210 may also, or alternatively, identify a four-bit combination (e.g., associated with XI, XQ, YI, and/or YQ components), stored within the data structure, that corresponds to the three-bit symbol stored within the data structure.

Additionally, or alternatively, optical transmitter 210 may generate a four-bit symbol that corresponds to the identified four-bit pattern. In one example, the four-bit symbol may correspond to a four-bit PM-QPSK symbol.

As further shown in FIG. 6, process 600 may include determining an encoding mechanism for the four-bit symbol (block 625), encoding the four-bit symbol based on the determined encoding mechanism (block 630), and transmitting the encoded four-bit symbol (block 635). For example, optical transmitter 210 may determine whether to encode the four-bit symbol based on a first encoding mechanism (e.g., a differential encoding mechanism), a second encoding mechanism (e.g., a coherent block encoding mechanism), and/or some other encoding mechanism. In one example, optical transmitter 210 may communicate with optical receiver 250 to determine a decoding mechanism used by optical receiver 250 to process received traffic and may determine the encoding mechanism based on the decoding mechanism used by optical receiver 250. For example, when optical receiver 250 is using a differential decoding mechanism, optical transmitter 210 may use a differential encoding mechanism and when optical receiver 250 is using a coherent block decoding mechanism, optical transmitter 210 may use a coherent block encoding mechanism. Additionally, or alternatively, optical transmitter 210 may use an encoding mechanism that is predetermined by optical transmitter 210 and/or an operator associated with optical transmitter 210.

When the determined encoding mechanism corresponds to the first encoding mechanism, optical transmitter 210 (e.g., differential encoder 222) may perform differential encoding on the four-bit symbol. Optical transmitter 210 may, in one example, perform the differential encoding on bits associated with a first polarization (e.g., X polarization) to generate encoded bits associated with in-phase and quadrature components (e.g., XI and XQ, respectively). Similarly, optical transmitter 210 may perform differential encoding on bits associated with a second polarization (e.g., Y polarization) to generate encoded bits associated with in-phase and quadrature components (e.g., YI and YQ, respectively). In this example, optical transmitter 210 may, in a manner similar to that described in FIG. 2, determine, on a bit-by-bit basis, a phase difference between a previously generated four-bit symbol and the four-bit symbol and may generate an encoded four-bit symbol based on the phase difference. Optical transmitter 210 (e.g., transmitter 226) may transmit the encoded four-bit symbol, to optical receiver 250, via optical fiber 270 and/or network 280.

When the determined encoding mechanism corresponds to the second encoding mechanism, optical transmitter 210 (e.g., block encoder 224) may perform coherent block encoding on the four-bit symbol. In this example, optical transmitter 210 may, in a manner similar to that described in FIG. 2, generate one or more control symbols associated with a reference phase, frequency, polarization, etc. and may insert the control symbols into a block of four-bit symbols to create an encoded block of symbols. Optical transmitter 210 (e.g., transmitter 226) may transmit the encoded block of four-bit symbols, to optical receiver 250, via optical fiber 270 and/or network 280.

In one example, optical transmitter 210 may cause a respective first pair of bits, associated with each four-bit symbol, to be delayed relative to a respective second pair of bits associated with each four-bit symbol. In one example, the first pair of bits may correspond to a first polarization (e.g., X polarization) and the second pair of bits may be associated with a second polarization (e.g., Y polarization). Additionally, or alternatively, the first pair of bits may be associated with the second polarization and the second pair of bits may be associated with the first polarization. The delay may cause the first pairs of bits to be transmitted after the second pairs of bits.

Figure 7:
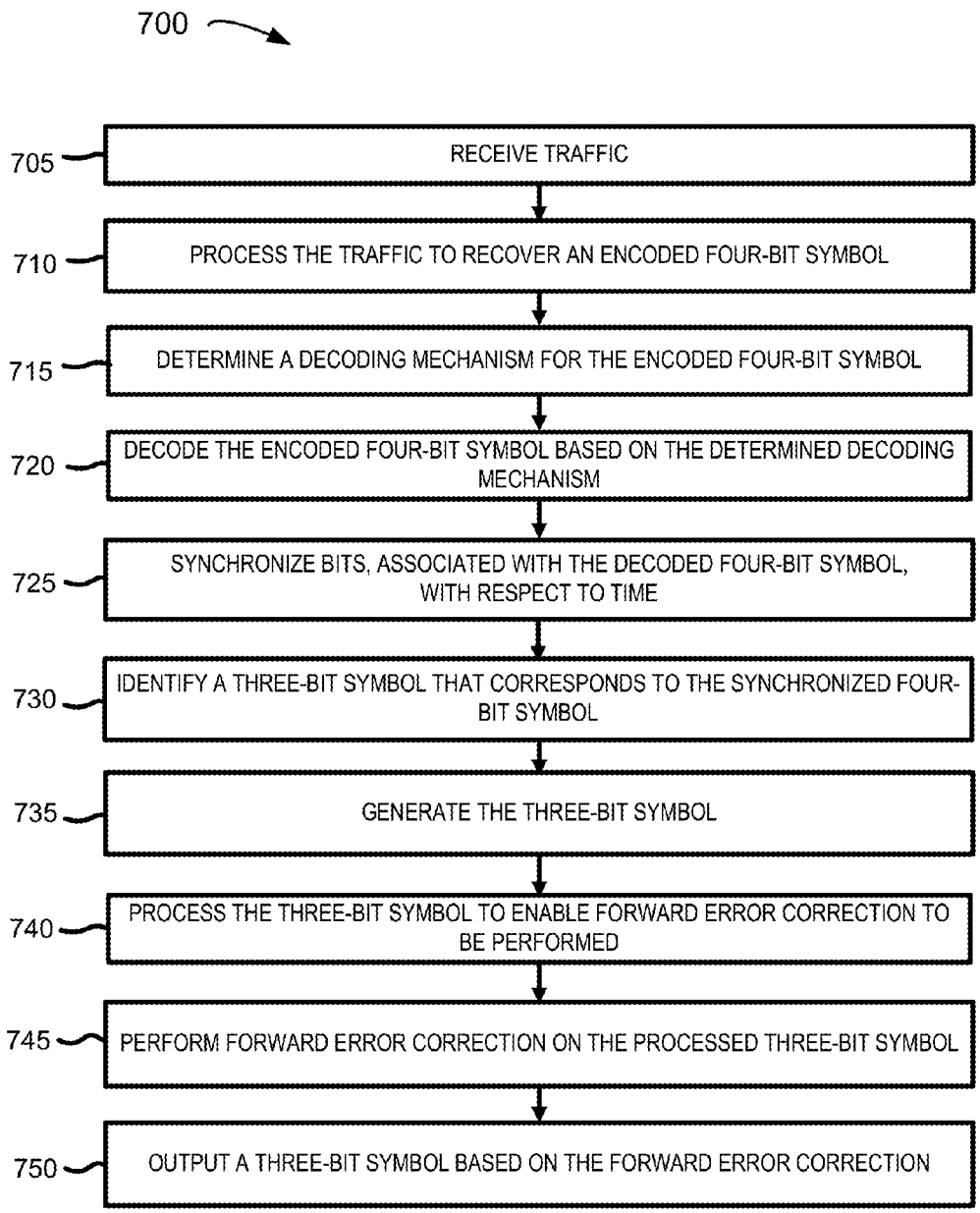
FIG. 7 is a flow chart of an example process for decoding 3QAM traffic, from traffic encoded based on the four-bit phase modulation scheme, in a manner that avoids creating errors when cycle slip occurs.

FIG. 7 is a flow chart of an example process 700 for decoding 3QAM traffic, from traffic encoded based on the four-bit phase modulation scheme, in a manner that avoids creating errors when cycle slip occurs. In one example implementation, process 700 may be performed by optical receiver 250. Alternatively, or additionally, some or all of process 700 may be performed by a device or collection of devices separate from, or in combination with, optical receiver 250.

As shown in FIG. 7, process 700 may include receiving traffic (block 705) and processing the traffic to recover an encoded four-bit symbol (block 710). For example, optical receiver 250 may receive traffic, from optical transmitter 210, via optical fiber 270 and/or network 280. Optical receiver 250 may also, or alternatively, process the traffic to obtain encoded four-bit symbols. For example, optical receiver 250 (e.g., receiver 252) may perform beam splitting on the traffic to generate an optical signal associated with a first polarization (e.g., X polarization or some other first polarization) and another optical signal associated with a second polarization (e.g., Y polarization or some other second polarization).

Additionally, or alternatively, optical receiver 250 may process the optical signals to create component signals, such as a first component signal associated with the first polarization and an in-phase component (e.g., XI); a second component signal associated with the first polarization and a quadrature component (e.g., XQ); a third component signal associated with the second polarization and the in-phase component (e.g., YI); and a fourth component signal associated with the second polarization and the quadrature component (e.g., YQ). Optical receiver 250 may also, or alternatively, perform demodulation and/or demultiplexing on the component signals to create electrical signals and may perform an analog-to-digital conversion to convert the electrical signals to digital signals (e.g., associated with XI, XQ, YI, and YQ). Optical receiver 250 may also, or alternatively, obtain four-bit symbols from the digital signals and may perform equalization on the four-bit symbols in a manner similar to that described above with respect to FIG. 2. The equalization may amplify particular frequencies associated with the four-bit symbols and/or change a polarization angle associated with the four-bit symbols. The equalization may, thus, enable a waveform and/or polarization angle, of the received four-bit symbols to be restored to a state that existed before the four-bit symbols were transmitted by optical transmitter 210.

Additionally, or alternatively, optical receiver 250 (e.g., carrier recovery 254) may, in a manner similar to that described above with respect to FIG. 2, perform carrier recovery on the four-bit symbols. The carrier recovery operation may identify and/or track phase noise, associated with the received symbols, that enables encoded four-bit symbols to be recovered. The carrier recovery operation may, however, cause cycle slips to occur in the traffic when an amount of phase noise (e.g., 90 degrees, 180 degrees, 270 degrees, etc. for PM-QPSK modulation), associated with the four-bit symbols, causes a modulation state, associated with a received four-bit symbol, to resemble a different modulation state than what was used to transmit the four-bit symbols. Optical receiver 250 may perform carrier recovery for each four-bit symbol (e.g., associated with XI, XQ, YI, and YQ components) to recover the encoded four-bit symbols that were transmitted by optical transmitter 210.

As also shown in FIG. 7, process 700 may include determining a decoding mechanism for the encoded four-bit symbol (block 715) and decoding the encoded four-bit symbol based on the determined decoding mechanism (block 720). For example, optical receiver 250 may determine whether to decode an encoded four-bit symbol based on a first decoding mechanism (e.g., a differential decoding mechanism), a second decoding mechanism (e.g., a coherent block decoding mechanism), and/or some other decoding mechanism. In one example, optical receiver 250 may communicate with optical transmitter 210 to determine an encoding mechanism that was used to encode the encoded four-bit symbol. Optical receiver 250 may determine the decoding mechanism based on the encoding mechanism used by optical transmitter 210. Additionally, or alternatively, optical receiver 250 may use a decoding mechanism that is predetermined by optical receiver 250 and/or an operator associated with optical receiver 250.

For example, when the encoded four-bit symbol is differentially encoded, optical receiver 250 (e.g., differential decoder 256) may perform differential decoding on the encoded four-bit symbol. In this example, optical receiver 250 may, in a manner similar to that described in FIG. 2, determine, on a bit-by-bit basis, phase differences between previously received encoded four-bit symbols (e.g., associated with XI, XQ, YI, and YQ components) and received four-bit symbols (e.g., associated with XI, XQ, YI, and YQ) and may generate decoded four-bit symbols (e.g., associated with XI, XQ, YI, and YQ) based on the phase differences.

Additionally, or alternatively, when the encoded four-bit symbol is coherently block encoded, optical receiver 250 (e.g., block decoder 258) may perform coherent block decoding on the four-bit symbol. In this example, optical receiver 250 may, in a manner similar to that described in FIG. 2, obtain, from a block of encoded four-bit symbols (e.g., 256 symbols or some other quantity of symbols), one or more control symbols (e.g., associated with XI, XQ, YI, and YQ) that were generated and/or inserted in the block of symbols by optical transmitter 210. Optical receiver 250 may identify one or more phase angles associated with the control symbols and may determine a difference between the identified phase angles and reference phase angles used, by optical transmitter 210, to generate the control symbols. Optical receiver 250 may decode the encoded four-bit symbols by resetting a phase, associated with the block of symbols, based on the difference between the identified phase angles and reference phase angles.

As further shown in FIG. 7, process 700 may include synchronizing bits, associated with the decoded four-bit symbol, with respect to time (block 725). For example, optical receiver 250 (e.g., delay device 260) may identify an amount of delay between a first pair of bits associated with a first polarization (e.g., X polarization) of the decoded four-bit symbol and a second pair of bits associated with a second polarization (e.g., Y polarization) of the decoded four-bit symbol. Optical receiver 250 may cause the second pair of bits to be delayed relative to first pair of bits by an amount of delay caused by optical transmitter 210 and/or an amount of delay that allows each of the pairs of bits to be received at a same point in time by a component (e.g., 3QAM decoder 262), associated with optical receiver 250, that converts four-bit symbols to three-bit symbols (e.g., 3QAM symbols).

As yet further shown in FIG. 7, process 700 may include identifying a three-bit symbol that corresponds to the synchronized four-bit symbol (block 730), and generating the three-bit symbol (block 735). For example, optical receiver 250 (e.g., 3QAM decoder 262) may determine a three-bit symbol (e.g., a 3QAM symbol) that corresponds to the four-bit symbol (e.g., a PM-QPSK symbol). In one example, optical receiver 250 may access a data structure (e.g., data structure 300 of FIG. 3) to identify eight possible four-bit combinations of values (e.g., associated with XI, XQ, YI, and/or YQ components), stored within the data structure (e.g., fields 310-325 of FIG. 3), that correspond to eight possible three-bit 3QAM symbols. Optical receiver 250 may, in a manner similar to that described above with respect to FIG. 5, determine distances between the four-bit symbol and the eight possible four-bit combinations of values and may identify a greatest distance, of the determined distances. Optical receiver 250 may also, or alternatively, generate a three-bit index value that corresponds to a particular four-bit symbol, of the eight possible four-bit symbols, with which the greatest distance is associated. Optical receiver 250 may also, or alternatively, generate a respective reliability value for each bit, associated with the three-bit index value, based on a difference between the greatest distance and another greatest distance associated with each of the bits of the index value. Optical receiver 250 may, in one example, invert a reliability value when a bit, associated with the three-bit index value and with which the reliability value is associated, is equal to a first value (e.g., 0 and/or some other first value). Optical receiver 250 may also, or alternatively, not invert a reliability value when a bit, associated with the three-bit index value and with which the reliability value is associated, is equal to a second value (e.g., 1 and/or some other second value). Optical receiver 250 may output respective reliability values and/or inverted reliability values that correspond to each bit of a decoded three-bit 3QAM symbol.

As still further shown in FIG. 7, process 700 may include processing the three-bit symbol to enable forward error correction to be performed (block 740). For example, optical receiver 250 may process traffic, based on the three-bit symbols, in an order that represents a reverse of an order in which optical receiver 210 processes traffic based on four-bit symbols. For example, optical receiver 250 (e.g., 3QAM mapper 218-2) may, in a manner similar to that described above with respect to FIG. 2, convert words, based on three-bit symbols, associated with three symbol streams and/or channels) to words associated with four symbol streams and/or channels that can be processed by one or more components associated with optical receiver 250 (e.g., FIFO 216-2, de-interleaver 264, and/or soft FEC decoder 266). Optical receiver 250 may, for example, enable words within the three symbol streams and/or channels to be converted to words within four symbol streams and/or channels using a mapping mechanism. The mapping mechanism may reverse a mapping mechanism, used by optical receiver 250, to convert words from four symbols streams and/or channels to words within three symbol streams and/or channels.

Optical receiver 250 may also, or alternatively, decrease a word size (e.g., from 256 symbols per word to 192 symbols per word) based on the ratio between the three-bit 3QAM symbol format and the four-bit symbol format. Optical receiver 250 may create the four symbols streams and/or channels, and/or decrease the word size in a manner that does not change a data rate (e.g., a bit rate, a throughput rate, a symbol rate, etc.) at which optical receiver 250 is processing traffic.

Additionally, or alternatively, optical receiver 250 (e.g., FIFO 216-2) may decrease a clock speed with which the words are processed (e.g., from F2, with which the symbols are received, to F1 with which symbols are outputted by FIFO 216-2) based on a ratio between a three-bit 3QAM symbol format and the four-bit symbol format (e.g., where F1=3/4*F2) associated with the four-bit phase modulation scheme. Additionally, or alternatively, optical receiver 250 may increase a word size used to process the symbols (e.g., from 192 symbols per word received from 3QAM mapper 218-2 to 256 symbols per word outputted by FIFO 216-2) based on the ratio between the three-bit 3QAM symbol format and the four-bit symbol format (e.g., where 192=3/4*256). Optical receiver 250 may decrease the clock speed and/or increase the word size in a manner that does not change a data rate (e.g., a bit rate, a throughput rate, a symbol rate, etc.) at which optical receiver 250 is processing traffic.

Additionally, or alternatively, optical receiver 250 (e.g., de-interleaver 264) may perform one or more de-interleaving operations on symbols in a manner similar to that described above with respect to FIG. 2. The de-interleaving operation may be based on a reverse of the interleaving pattern used by optical transmitter 210 and/or a manner that enables soft forward error correction decoding to be performed on the symbols.

As also shown in FIG. 7, process 700 may include performing forward error correction on the processed three-bit symbol (block 745) and output a three-bit symbol based on the forward error correction (block 750). For example, optical receiver 250 (e.g., soft FEC decoder 266) may decode symbols obtained from the de-interleaved words using a soft forward error correction decoding mechanism. The soft error decoding mechanism may be related to the soft error encoding mechanism used by optical transmitter 210. Optical receiver 250 may output bits, associated with the three-bit symbols, on which the forward error correction decoding was performed.

Systems and/or methods, described herein, may enable an optical transmitter to encode 3QAM traffic using a four-bit phase modulation scheme and to transmit the encoded 3QAM traffic to an optical receiver. The systems and/or methods may enable the optical receiver to process the encoded 3QAM traffic in a manner that recovers the 3QAM traffic without creating errors due to cycle slip. Avoiding the creation of errors may enable the 3QAM traffic to be transmitted without losing data and/or causing a disruption of services.

The foregoing description provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 6 and 7, the order of the blocks may be changed in other implementations. Also, non-dependent blocks may be performed in parallel.

Furthermore, while the disclosed embodiments have been presented as generally suitable for use in an optical network, the systems and methods disclosed herein are suitable for any fiber optic network, fiber network, fiber line, or link that includes one or more transmission spans, amplifier spans, or hops.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
receiving, by an optical receiver, traffic that includes four-bit symbols, the four-bit symbols being encoded using a four-bit phase modulation scheme;
processing, by the optical receiver, the traffic to recover a four-bit symbol of the four-bit symbols;
decoding, by the optical receiver, the recovered four-bit symbol to obtain a three-bit symbol, the three-bit symbol being associated with a three-quadrature amplitude modulation (3QAM) scheme, the decoding being performed without creating an error, within the traffic, when cycle slip occurs,
the cycle slip occurring when the recovered four-bit symbol includes a first state, of a set of modulation states associated with the four-bit phase modulation scheme, that is different than a second state, of the set of modulation states, that exists before the recovered four-bit symbol is transmitted to the optical receiver; and
outputting, by the optical receiver, the traffic based on the three-bit symbol.

2. The method of claim 1, where the four-bit phase modulation scheme corresponds to a polarization multiplexed-quadrature phase shift keying (PM-QPSK) modulation scheme.

3. The method of claim 1, where processing the traffic to recover the four-bit symbol includes:
performing equalization, on the four-bit symbol, to restore a polarization angle or waveform, associated with the four-bit symbol, that exists before the recovered four-bit symbol is transmitted to the optical receiver; and decoding the equalized four-bit symbol based on the restored polarization angle or waveform.

4. The method of claim 1, where processing the traffic to recover the four-bit symbol includes:
performing carrier recovery, on the four-bit symbol, that causes an amount phase, associated with the four-bit symbol to be reset to a particular amount of phase based on an amount of phase noise associated with the four-bit symbol; and
decoding the recovered four-bit symbol based on the reset amount of phase.

5. The method of claim 1, where processing the traffic to recover the four-bit symbol includes:
determining whether the four-bit symbol is encoded using a first encoding mechanism or a second encoding mechanism; and
decoding the four-bit symbol using a first decoding mechanism or a second decoding mechanism based on whether the four-bit symbol is encoded using the first encoding mechanism or the second encoding mechanism,
the decoding being performed using the first decoding mechanism when the first encoding mechanism is used to encode the four-bit symbol, and
the decoding being performed using the second decoding mechanism when the second encoding mechanism is used to encode the four-bit symbol.

6. The method of claim 5, where:
the first encoding mechanism corresponds to differential encoding,
the first decoding mechanism corresponds to differential decoding, the differential decoding being associated with the differential encoding,
the second encoding mechanism corresponds to coherent block encoding, and
the second decoding mechanism corresponds to coherent block decoding, the coherent block decoding being associated with the coherent block encoding.

7. The method of claim 1, where decoding the recovered four-bit symbol further includes:
determining a set of distances between the recovered four-bit symbol and each of a set of four-bit symbols associated with the four-bit phase modulation scheme,
each of the set of four-bit symbols corresponding to a different one of a set of three-bit symbols associated with the 3QAM scheme;
determining a greatest distance, of the set of distances;
identifying a particular four-bit symbol, of the set of four-bit symbols, with which the greatest distance is associated;
determining that the three-bit symbol, of the set of three bit symbols, corresponds to the particular four-bit symbol; and
outputting the determined three-bit symbol.

8. The method of claim 7, further comprising:
identifying a first bit, associated with the determined three-bit symbol;
identifying another greatest distance between the recovered four-bit symbol and a portion of the set of four-bit symbols;
generating a reliability value, associated with the first bit, based on a difference between the greatest distance and the other greatest distance;
determining whether a value, associated with the first bit, corresponds to a first value or a second value;
inverting the reliability value when the value corresponds to the first value; and
outputting the determined three-bit symbol in a manner that includes the inverted reliability value.

9. An optical receiver device, comprising:
one or more components to:
receive traffic associated with a three-bit phase modulation scheme, the traffic including a plurality of four-bit symbols, the plurality of four-bit symbols being encoded using a four-bit phase modulation scheme,
process the traffic to obtain, from the traffic, a four-bit symbol of the plurality of four-bit symbols,
decode the four-bit symbol to create a decoded four-bit symbol, the decoded four-bit symbol being associated with a first modulation state, of a set of modulation states, associated with the four-bit phase modulation scheme,
generate, based on the decoded four-bit symbol, a three-bit symbol, the three-bit symbol corresponding to the three-bit phase modulation scheme, and the generating being performed in a manner that does not cause an error when cycle slip occurs,
the cycle slip occurring when the first modulation state is different than a second modulation state, with which the four-bit symbol was associated, before the four-bit symbol is transmitted to the optical receiver device, and output the three-bit symbol.

10. The optical receiver device of claim 9, where the one or more components are further to:
delay one or more bits associated with the decoded four-bit symbol, delaying the one or more bits causing each bit, of the decoded four-bit symbol, to be synchronized with respect to time, and
determine a particular four-bit symbol, of a set of four-bit symbols associated with the four-bit phase modulation scheme, to which the decoded four-bit symbol most closely corresponds based on each bit, of the decoded four-bit symbol, being synchronized with respect to time,
identify a symbol, of a set of three-bit symbols, associated with the three-bit phase modulation scheme, to which the particular four-bit symbol corresponds, and
generate the three-bit symbol based on the identified symbol.

11. The optical receiver device of claim 9, where the one or more components are further to:
process, using a forward error correction decoding mechanism, the three-bit symbol to identify or correct errors associated with the three-bit symbol,
the forward error correction decoding mechanism corresponding to a forward error correction encoding mechanism used to encode the three-bit symbol before the three-bit symbol is transmitted to the receiver device.

12. The optical receiver device of claim 9, where, when processing the traffic, the one or more components are further to:
perform carrier recovery, on the four-bit symbol, that causes an amount phase, associated with the four-bit symbol, to be reset based on an amount of phase noise associated with the four-bit symbol, and
identify the first modulation state based on performing the carrier recovery on the four-bit symbol.

13. The optical receiver device of claim 9, where, when processing the traffic, the one or more components are to:
communicate with a transmitter device to determine whether the traffic is encoded using differential encoding or coherent block encoding, and decode the recovered one of the four-bit symbols using at
least one of:
differential decoding when the traffic is encoded using
the differential encoding, or
coherent block decoding when the traffic is encoded
using the coherent block encoding.

14. The optical receiver device of claim 9, where, when generating the three-bit symbol, the one or more components are further to:
determine distances between the decoded four-bit symbol and a set of four-bit symbols associated with the four-bit phase modulation scheme,
determine a greatest one of the distances,
identify a particular four-bit symbol, of the set of four-bit symbols, with which the greatest one of the distances is associated,
determine a particular three-bit symbol, of a set of three bit symbols associated with the three-bit phase modulation scheme, that corresponds to the particular four-bit symbol, and
generate the three-bit symbol based on the determination of the particular three-bit symbol.

15. The optical receiver device of claim 14, where, when determining the particular three-bit symbol, the one or more components are further to:
identify a first bit associated with the particular three-bit symbol,
determine another greatest distance from among distances between the decoded four-bit symbol and a portion of the set of four-bit symbols,
determine a reliability value that corresponds to a difference between the greatest distance and the other greatest distance,
determine whether the first bit corresponds to a first value or a second value,
invert the reliability value when the first bit corresponds to the first value; and
generate the three-bit symbol to include the inverted reliability value.

16. The optical receiver device of claim 15, where the one or more components are further to:
generate the three-bit symbol in a manner that does not include the inverted reliability value when the first bit corresponds to the second value.

17. An optical transmitter device, comprising:
one or more components to:
receive traffic that includes a plurality of bits,
process one or more bits, of the plurality of bits, to create a three-bit symbol, of a set of three-bit symbols, associated with a three-quadrature amplitude modulation (3QAM) mechanism,
identify a four-bit symbol, of a set of four-bit symbols associated with a polarization multiplexed-quadrature phase shift keying (PM-QPSK) modulation mechanism, that corresponds to the three-bit symbol,
generate the identified four-bit symbol,
encode the identified four-bit symbol, and
transmit the encoded four-bit symbol.

18. The optical transmitter device of claim 17, where, when identifying the four-bit symbol, the one or more components are further to:
identify, within a memory, a particular three-bit symbol, of the set of three-bit symbols, that matches the three-bit symbol, and
identify, within the memory, the four-bit symbol that corresponds to the particular three-bit symbol.

19. The optical transmitter device of claim 17, where, when encoding the identified four-bit symbol, the one or more components are further to:
determine whether the identified four-bit symbol is to be decoded using a first decoding mechanism or a second decoding mechanism; and
encode the identified four-bit symbol using a first encoding mechanism or a second encoding mechanism based on whether the identified four-bit symbol is to be decoded using the first decoding mechanism or the second decoding mechanism,
the encoding being performed using the first encoding mechanism when the first decoding mechanism is to be used to decode the identified four-bit symbol, and
the encoding being performed using the second encoding mechanism when the second decoding mechanism is used to decode the identified four-bit symbol.

20. The optical transmitter device of claim 19, where:
the first decoding mechanism corresponds to differential decoding,
the first encoding mechanism corresponds to differential encoding, the differential encoding being associated with the differential decoding,
the second decoding mechanism corresponds to coherent block decoding, and
the second encoding mechanism corresponds to coherent block encoding, the coherent block encoding being associated with the coherent block encoding.

21. A system comprising:
an optical transmitter device to:
receive traffic that includes a plurality of three-bit symbols associated with three-quadrature amplitude modulation (3QAM),
encode the traffic, the encoding causing a three-bit symbol, of the plurality of three-bit symbols, to be encoded as a four-bit symbol associated with polarization multiplexed-quadrature phase shift keying (PM-QPSK) modulation, and
output the encoded traffic, the encoded traffic including the four-bit symbol; and
an optical receiver device to:
receive the encoded traffic,
process the encoded traffic to recover the four-bit symbol,
decode the four-bit symbol to recover the three-bit symbol, the decoding being performed without creating an error, in the traffic, when cycle slip occurs when the traffic is processed, and
output the processed traffic, the processed traffic including the recovered three-bit symbol.

22. The system of claim 21, where the optical transmitter device is further to:
encode the four-bit symbol using a first encoding mechanism or a second encoding mechanism, and
output the encoded four-bit symbol based on the first encoding mechanism or the second encoding mechanism.

23. The system of claim 22, where, when processing the encoded traffic to recover the four-bit symbol, the optical receiver device is further to:
determine whether the encoded four-bit symbol is encoded using the first encoding mechanism or the second encoding mechanism, and
decode, using a first decoding mechanism or a second decoding mechanism, the encoded four-bit symbol to recover the four-bit symbol based on whether the encoded four-bit symbol is encoded using the first encoding mechanism or the second encoding mechanism, the decoding being performed using the first decoding mechanism when the encoded four-bit symbol is encoded using the first encoding mechanism, and the decoding being performed using the second decoding mechanism when the encoded four-bit symbol is encoded using the second encoding mechanism.

24. The system of claim 21, where, when decoding the four-bit symbol, the optical receiver is further to:

determine distances between the decoded four-bit symbol and a set of four-bit symbols associated with the PM-QPSK modulation, determine a greatest one of the distances, identify a particular four-bit symbol, of the set of four-bit symbols, with which the greatest one of the distances is associated, determine a particular three-bit symbol, of a set of three bit symbols associated with the 3QAM, that corresponds to the particular four-bit symbol, and generate the particular recovered three-bit symbol based on the determination of the particular three-bit symbol.

25. The system of claim 24, where the optical receiver is further to:

identify a first bit associated with the particular three-bit symbol, determine another greatest distance from among distances between the decoded four-bit symbol and a portion of the set of four-bit symbols, determine a reliability value, associated with the first bit, based on a difference between the greatest distance and the other greatest distance, determine whether the first bit is equal to a first value or a second value, invert the reliability value when the first bit is equal to the first value; and generate the recovered three-bit symbol based on the particular three-bit symbol and the inverted reliability value.

* * * * *